(12) United States Patent
Minagawa et al.

(10) Patent No.: US 7,204,776 B2
(45) Date of Patent: *Apr. 17, 2007

(54) HYBRID TRANSMISSION AND ITS ASSEMBLING METHOD

(75) Inventors: Yuusuke Minagawa, Kanagawa (JP);
Masaki Nakano, Yokohama (JP);
Toshikazu Oshidari, Kanagawa (JP);
Yasuhiro Yamauchi, Kanagawa (JP);
Keyvan Kargar, Versailles (FR); Yves Pichon, Boulogne-Billancourt (FR)

(73) Assignees: Nissan Motor Co., Ltd., Yokohama-shi (JP); Renault s.a.s. societe par actions simplifiee, Boulogne-Billancourt (FR)

( * ) Notice: Subject to any disclaimer, the term of this patent is extended or adjusted under 35 U.S.C. 154(b) by 15 days.

This patent is subject to a terminal disclaimer.

(21) Appl. No.: 11/134,374

(22) Filed: May 23, 2005

(65) Prior Publication Data

US 2005/0233851 A1 Oct. 20, 2005

Related U.S. Application Data

(62) Division of application No. 10/361,611, filed on Feb. 11, 2003, now Pat. No. 6,910,981.

(30) Foreign Application Priority Data

Feb. 26, 2002 (JP) ............................ 2002-049713

(51) Int. Cl.
*F16H 3/72* (2006.01)
*F16H 37/06* (2006.01)

(52) U.S. Cl. ................................ 475/5; 475/8; 475/10

(58) Field of Classification Search .................... 475/5, 475/8, 10, 271, 285, 317
See application file for complete search history.

(56) References Cited

U.S. PATENT DOCUMENTS

| 6,019,697 | A  | 2/2000  | Colletti        |
| 6,114,784 | A  | 9/2000  | Nakano          |
| 6,732,526 | B2 | 5/2004  | Minagawa et al. |
| 6,751,960 | B2 | 6/2004  | Arimitsu        |
| 6,819,985 | B2 | 11/2004 | Minagawa et al. |
| 6,852,053 | B2 | 2/2005  | Nakano et al.   |

(Continued)

FOREIGN PATENT DOCUMENTS

DE        199 09 424 A1    8/2000

(Continued)

*Primary Examiner*—Tisha Lewis
(74) *Attorney, Agent, or Firm*—Foley & Lardner LLP

(57) ABSTRACT

In a hybrid transmission and its assembling method, a differential unit is constituted by a single pinion planetary gear set and a double pinion planetary gear set holding a carrier in common to the single planetary gear set and having five rotary members from among which, when revolution states of two rotary members are determined, those of the other rotary members are determined, an input end from a prime mover is coupled to a ring gear of the double pinion planetary gear set, an output end to a drive system that is coupled to the common carrier, a first motor/generator that is coupled to a sun gear of the double pinion planetary gear set, a second motor/generator that is coupled to a sun gear of the single pinion planetary gear set, and a brake enabled to brake a ring gear of the single pinion planetary gear set.

9 Claims, 18 Drawing Sheets

U.S. PATENT DOCUMENTS

| | | |
|---|---|---|
| 6,994,646 B2 * | 2/2006 | Ai .................................. 475/5 |
| 7,004,868 B2 * | 2/2006 | Oshidari et al. ................ 475/5 |
| 2003/0064847 A1 | 4/2003 | Oshidari et al. |
| 2003/0073534 A1 | 4/2003 | Oshidari et al. |

FOREIGN PATENT DOCUMENTS

| | | |
|---|---|---|
| DE | 201 17 410 U1 | 1/2002 |
| EP | 0 967 102 A2 | 12/1999 |
| EP | 1 142 744 A1 | 10/2001 |
| EP | 1 160 117 A2 | 12/2001 |
| FR | 2 811 267 A1 | 1/2002 |
| JP | 2000-142146 A | 5/2000 |

* cited by examiner

FIG.9

| MOTOR/GENERATOR REQUIRED PERFORMANCE | | IN A CASE OF FIG.1 (1+α)<β | IN A CASE WHERE PLANETARY GEAR COUPLES 4,5 ARE INVERSELY ARRANGED (1+α)>β |
|---|---|---|---|
| | | α  1.1 | α  1.1 |
| | | β  2.4 | β  1.85 |
| | | γ  1.14 | γ  0.88 |
| | | MG2 ENG  Out Rs MG1  F/B (A1) | MG2 ENG  Out Rs MG1  F/B |
| | | BRK | BRK |
| OUTER ROTOR ROTATION SPEED | N1 | 1.51 | 1.40 |
| OUTER ROTOR TORQUE | T1 | 0.26 | 0.29 |
| INNER ROTOR ROTATION SPEED | N2 | −0.59 | −0.47 |
| INNER ROTOR TORQUE | T2 | 0.64 | 0.86 |
| MOTOR POWER | P | 0.39 | 0.41 |
| REDUCTION GEAR RATIO | Ired | 5.7 | 6.2 |

HYBRID TRANSMISSION AND ITS ASSEMBLING METHOD

The present application is a divisional of U.S. application Ser. No. 10/361,611, filed Feb. 11, 2003 now U.S. Pat. No. 6,910,981, the entire contents of which are incorporated herein by reference.

BACKGROUND OF THE INVENTION

1. Field of the Invention

The present invention relates to, so-called, hybrid transmission and its assembling method suitable for a hybrid vehicle in which a plurality of power sources such as an engine (a prime mover) and a motor are mounted. The present invention particularly relates to the hybrid transmission and its assembling method which are capable of performing a continuously variable transmission operation through a differential unit such as a planetary gear mechanism.

2. Description of the Related Art

A Japanese Patent Application First Publication No. 2000-142146 published on May 23, 2000 exemplifies a previously proposed hybrid transmission using such a kind of differential unit as described above. In the previously proposed hybrid transmission, three rotary members of a sun gear, a carrier, and a ring gear constitute a planetary gear mechanism. A two-degree of freedom differential unit determines a rotating state of the other member if two of the three rotary members determine rotation states thereof is provided as the planetary gear mechanism and, in an order of revolution speeds, a generator, an input from an engine, an output to a drive system, and motor/generator are sequentially coupled to the three rotary members in an order of revolution speed so as to constitute the hybrid transmission. According to the previously proposed hybrid transmission, a differential function of the differential unit is utilized to provide a part of engine output for the drive of a generator and the supply of the generated power by the generator permits an increase or a decrease of a continuously variable transmission and an output torque.

SUMMARY OF THE INVENTION

However, in the previously proposed hybrid transmission, it is not possible to amplify outputs of the engine and motor/generator which are the generating sources of a vehicular driving force. From the above-described mechanical restriction, it is not easy to enlarge a mechanical energy passing through the differential unit. Hence, it is accordingly necessary to enlarge a capacity of the generator and the motor/generator. Especially, since a rate of a power passing the generator and the motor/generator to the power passing through the differential unit becomes approached to 1 in a lower speed direction and it becomes possible to enlarge more than 1. Hence, in order to secure the driving force sufficiently required for the vehicle to be started, it becomes necessary to provide a high output driving force generator equal to or near to that of the engine at the generator and the motor/generator side. Accordingly, a size and/or weight of the hybrid transmission becomes accordingly large. A power transmission efficiency becomes lowered.

It is, hence, an object of the present invention to provide a hybrid transmission and its assembling method in which such an improvement as to make possible the amplification of the outputs of the engine and motor/generator is made on the basis of such a fact recognition that the above-described problem is caused by the fact that the outputs of the engine and motor/generator cannot be amplified.

According to a first aspect of the present invention, there is provided a hybrid transmission, comprising: a two-degree of freedom differential unit constituted by a single pinion planetary gear set and a double pinion planetary gear set holding a carrier in common to the single planetary gear set and having five rotary members from among which, when revolution states of two rotary members are determined, those of the other rotary members are determined; an input end of the hybrid transmission from a prime mover that is coupled to a ring gear of the double pinion planetary gear set; an output end of the hybrid transmission to a drive system that is coupled to the common carrier; a first motor/generator that is coupled to a sun gear of the double pinion planetary gear set; a second motor/generator that is coupled to a sun gear of the single pinion planetary gear set; and a brake enabled to brake a ring gear of the single pinion planetary gear set.

According to a second aspect of the present invention, there is provided a hybrid transmission, comprising: a two-degree of freedom differential unit constituted by a single pinion planetary gear set and a double pinion planetary gear set holding a carrier in common to the single planetary gear set and having five rotary members from among which, when revolution states of two rotary members are determined, those of the other rotary members are determined; an input end of the hybrid transmission from a prime mover that is coupled to a ring gear of the double pinion planetary gear set; an output end of the hybrid transmission to a drive system that is coupled to a ring gear of the single pinion planetary gear set; a first motor/generator that is coupled to a sun gear of the double pinion planetary gear set; a second motor/generator that is coupled to a sun gear of the single pinion planetary gear set; and a brake enabled to brake the common carrier.

According to a third aspect of the present invention, there is provided an assembling method of a hybrid transmission, the hybrid transmission comprising a two-degree of freedom differential unit constituted by a single pinion planetary gear set and a double pinion planetary gear set holding a carrier in common to the single planetary gear set and having five rotary members from among which, when revolution states of two rotary members are determined, those of the other rotary members are determined and the assembling method comprising; coupling an input end of the hybrid transmission from a prime mover to a ring gear of the double pinion planetary gear set; coupling an output end of the hybrid transmission to a drive system to the common carrier; coupling a first motor/generator coupled to a sun gear of the double pinion planetary gear set; coupling a second motor/generator to a sun gear of the single pinion planetary gear set; and installing a brake enabled to brake a ring gear of the single pinion planetary gear set.

According to a fourth aspect of the present invention, there is provided an assembling method for a hybrid transmission, the hybrid transmission comprising a two-degree of freedom differential unit constituted by a single pinion planetary gear set and a double pinion planetary gear set holding a carrier in common to the single planetary gear set and having five rotary members from among which, when revolution states of two rotary members are determined, those of the other rotary members are determined, and the method comprising; coupling an input end of the hybrid transmission from a prime mover to a ring gear of the double pinion planetary gear set; coupling an output end of the hybrid transmission to a drive system to a ring gear of the single pinion planetary gear set; coupling a first motor/generator coupled to a sun gear of the double pinion planetary gear set; coupling a second motor/generator coupled to a sun gear of the single pinion planetary gear set; and installing a brake enabled to brake the common carrier.

This summary of the invention does not necessarily describe all necessary features so that the invention may also be a sub-combination of these described features.

BRIEF DESCRIPTION OF THE DRAWINGS

FIG. 9 is an operation comparison explanatory view for explaining an operation characteristic of the hybrid transmission shown in FIG. 1A by comparing that of the comparative example of the hybrid transmission shown by FIG. 3.

DETAILED DESCRIPTION OF THE PREFERRED EMBODIMENTS

Reference will hereinafter be made to the drawings in order to facilitate a better understanding of the present invention.

Figure 1A:
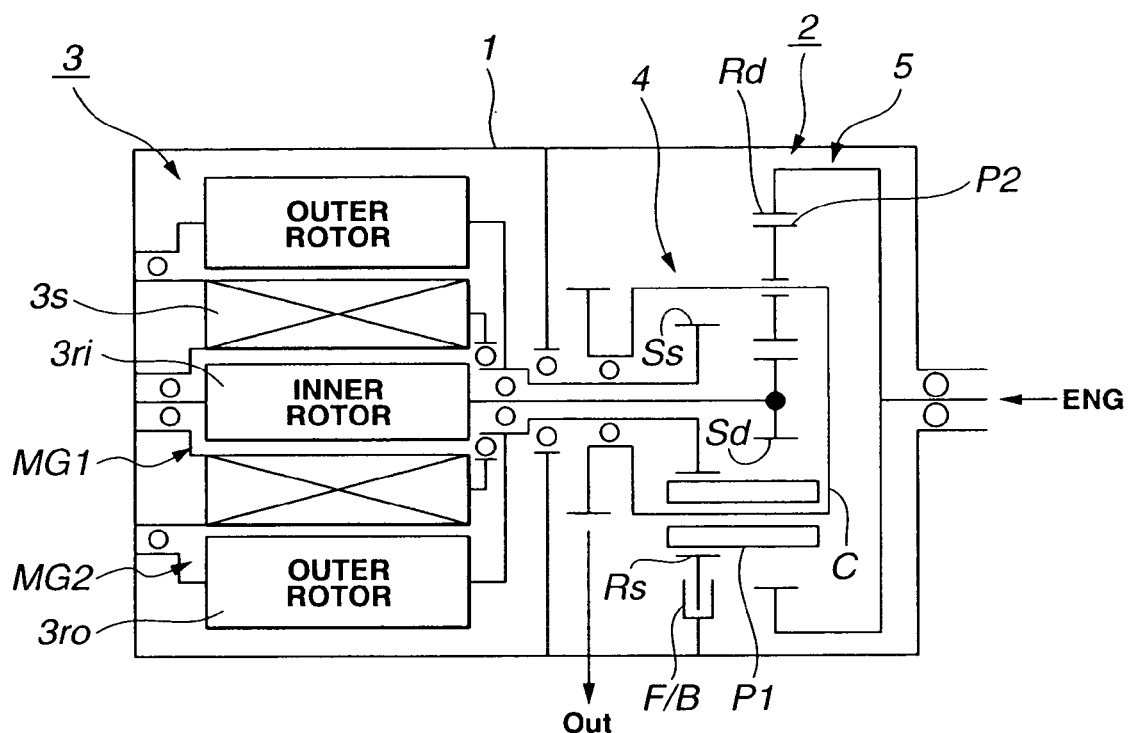
FIG. 1A is a rough longitudinal cross sectional view of a hybrid transmission in a first preferred embodiment according to the present invention.

FIG. 1A shows a first preferred embodiment of a hybrid vehicle according to the present invention which achieves the object of the present invention when a forward revolution output state occurs. In this embodiment, it is suitable for a use as a transaxle of a front-engine, front-drive (FF car) vehicle. In FIG. 1A, a reference numeral 1 denotes a hybrid transmission casing (generally cylindrical). A Ravigneaux type planetary gear set 2 is incorporated at an engine ENG (a primary power source, viz., a prime mover) side located at a right side (as viewed from FIG. 1A) within transmission casing 1 in an axial line direction and a couple of motor/generators, for example, having a compound current driven by two-layer motor 3 are incorporated in the transmission housing 1 at a rear end opposite to the engine ENG side of transmission casing 1. These Ravigneaux type planetary gear set 2 and compound current driven two-layer motor 3 are coaxially disposed along the axial line of transmission casing 1.

Ravigneaux type planetary gear set 2 is constituted by a combination of a single pinion planetary gear set 4 and a double planetary gear set 5, these sets commonly having a pinion P1 and ring gear Rs. Single pinion planetary gear set 4 is disposed at compound current driven two-layer motor 3 and, on the other hand, double pinion planetary gear set 5 is disposed at the engine ENG side.

Single pinion planetary gear set 4 is structured so as to be meshed with pinion P1 and ring gear Rs. Double pinion planetary gear set 5 includes a ring gear Rd and a large-diameter pinion P2 additionally installed apart from common ring gear Rs other than a sun gear Sd and common pinion P1.

Large-diameter pinion P2 is meshed with three rotary elements of sun gear Sd, ring gear Rd, and common pinion P1. All of pinion P1 and P2 of planetary gear sets 4 and 5 are rotatably supported by common carrier C. Ravigneaux type planetary gear set 2 described above has main elements of five rotary members of sun gear Ss, sun gear Sd, ring gear Rs, and carrier C and is constituted by the two-degree of freedom differential unit such that, when revolution speeds of two rotary members are determined, the revolution speeds of the other members are determined.

In this embodiment, for Ravigneaux type planetary gear set 2, an engine crankshaft is coupled to ring gear Rd in such a manner that the revolutions of engine ENG (not shown in details) coaxially disposed at the right side shown in FIG. 1A are inputted to ring gear Rd of double pinion planetary gear set 5. On the other hand, a road wheel drive system Out (for example, a differential gear as will be described later) is coupled to carrier C so that an output revolution from Ravigneaux type planetary gear set 2 are taken out from common carrier C.

Compound current driven two-layer motor 3 includes an inner rotor 3ri, a circular outer rotor 3ro enclosing inner rotor 3ri, both rotors 3ri and 3ro being coaxially and rotatably supported on rear axial ends within transmission casing 1, and a stator 3s constituted by circular coils and which is coaxially disposed in a circular space between inner rotor 3ri and outer rotor 3ro.

As described above, circular coil 3s and inner rotor 3ri are constituted by a first motor/generator MG1 which is an inside motor/generator. Circular coil 3s and outer rotor 3ro are constituted by a second motor/generator MG2 which is an outside motor/generator.

Motor/generators MG1 and MG2 function as motors to output revolutions in individual directions according to a compound current direction when the compound current is supplied to stator 3s and to output the revolutions of individual speeds (including a stop of the motor/generator) in accordance with a magnitude of the supplied compound current. When no compound current is supplied, the first and second motor/generators function as generators to generate an electric power in accordance with external forces.

When a coupling between compound current driven two-layer motor 3 and Ravigneaux type planetary gear set 2 is carried out, first motor/generator MG1 (in more details, an inner rotor 3ri) is connected to sun gear Sd of double pinion planetary gear set 5.

Second motor/generator MG2 (in more details, outer motor 3ro) is connected to sun gear Ss of single pinion planetary gear set 4. In this embodiment, a forward brake F/B is installed to enable a suitable braking of ring gear Rs of single pinion planetary gear set 4.

Figure 2:
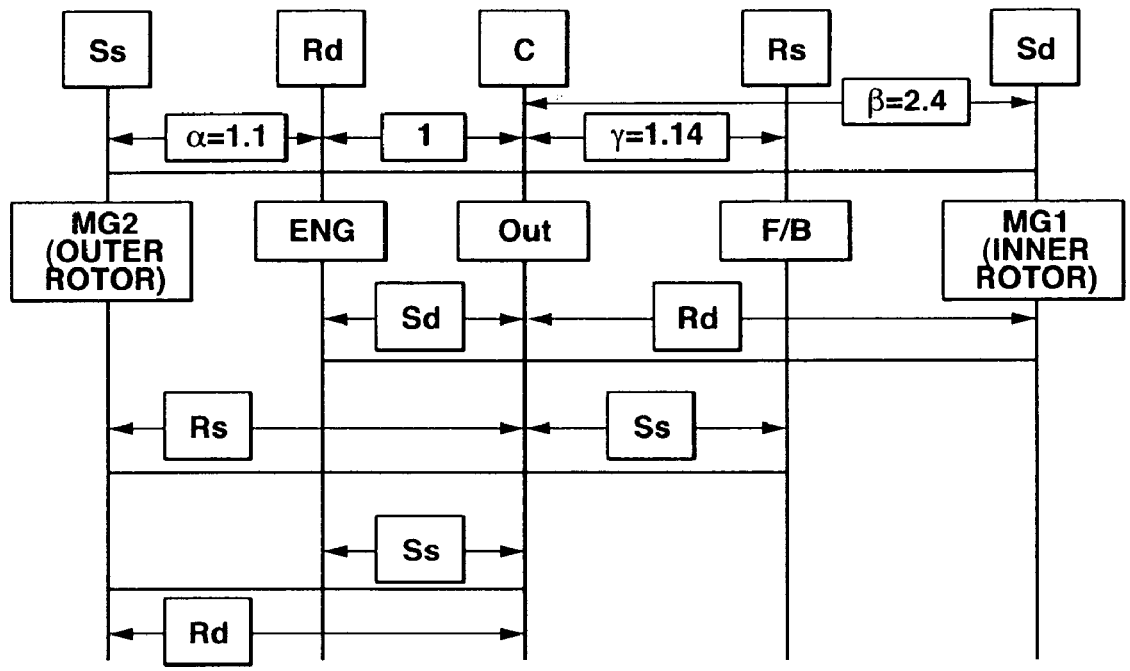
FIG. 2 is an alignment chart of the hybrid transmission shown in FIG. 1A.

FIG. 2 shows an alignment chart representing hybrid transmission 1 shown in FIG. 1A. Since pinion P1 meshed with sun gear Ss is not meshed with sun gear Sd, a relationship such that Sd<Ss is present in terms of a diameter between sun gears Ss and Sd. For the similar reason, a relationship such that Rs<Rd in terms of the diameter between ring gears Rs and Rd is present. A diameter of ring gear Rs in single pinion planetary gear set 4 is considerably larger than that of sun gear Ss (Rs >>Ss). Number of teeth of ring gear Rd serve to determine a distance between carrier C and motor/generator MG1 (sun gear Sd). It will be appreciated that a lever ratio β (=Rd/Sd) representing a ratio of a distance between sun gear Sd and carrier C and carrier C and first motor/generator MG1 (sun gear Sd). It is noted that, as shown in FIG. 2, α denotes a ratio of the distance between ring gear Rd and sun gear Ss with respect to the distance of 1 between carrier C and ring gear Rd and γ denotes a ratio of the distance between carrier C and ring gear Rs with respect to the distance of 1 between carrier C and ring gear Rd. It will also be appreciated from FIG. 2 that lever ratio β (=Rd/Sd) representing the ratio of the distance between sun gear Sd and carrier C to the distance between ring gear Rd and carrier C (this is indicated by 1 shown in FIG. 2) is the largest that can be thought in a case where Ravigneaux type planetary gear set 2 is used.

As described above, large lever ratio β means that the revolution speed of first motor/generator MG1 becomes relatively large. Consequently, this means that if Output (Out) is supposed to be constant, it can be designed that the required torque becomes small. It is noted that a ratio of the number of teeth between ring gear Ra and sun gear Sd is supposed to be Rd/Sd=2.1 and the ratio of number of teeth between ring gear Rs and sun gear Ss is supposed to be Rs/Ss=1.85. At this time, α, β, and γ in FIG. 2 indicate that α=1.1, β=2.4, and γ=1.14.

Figure 1B:
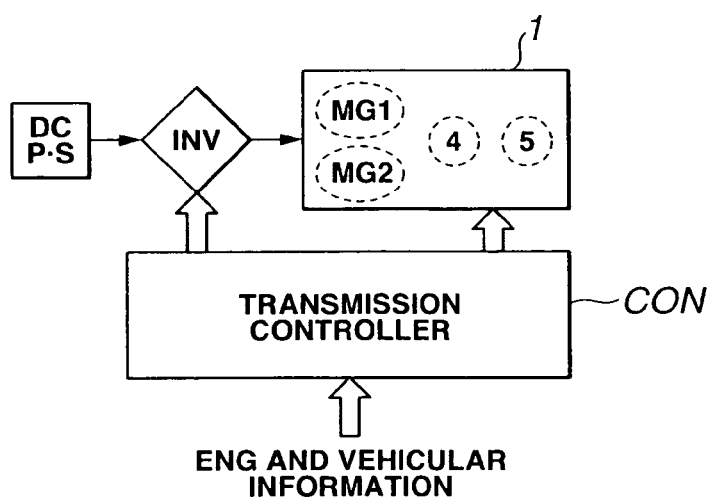
FIG. 1B is a schematic circuit block diagram around the hybrid transmission shown in FIG. 1A.

A transmission gear operation when the forward (normal or positive) revolution output state occurs in the hybrid transmission shown in FIG. 1A will be described below. It is noted that a transmission gear control program as described below is stored in a transmission controller CON shown in FIG. 1B. In FIG. 1B, DC P.S denotes a dc power supply, INV denotes an inverter connected to the stator 3S of the first and second motor/generators MG1 and MG2.

Figure 4:
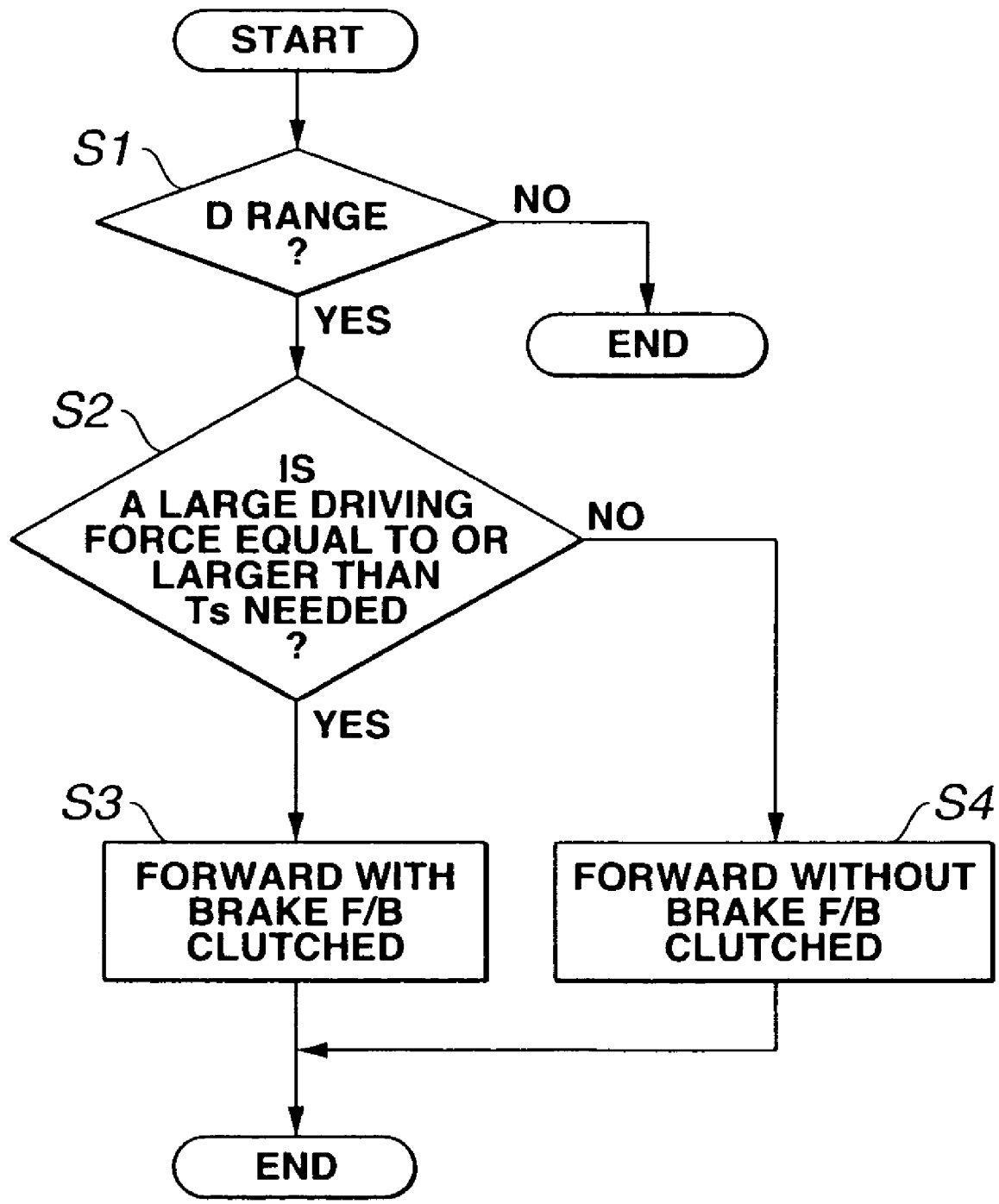
FIG. 4 is an operational flowchart representing an example of a transmission gear control program executed in a transmission controller during a forward revolution output state of the hybrid transmission shown in FIG. 1A.

That is to say, at a step S1 in FIG. 4, a controller CON determines whether hybrid transmission 1 falls in a forward run (D (drive)) range. If Yes at step S1, the routine goes to a step S2. At step S2, controller CON determines whether there is a demand on a large driving force equal to or larger than a predetermined driving force Ts to perform a driving over a curb or step. If Yes at step S2, controller CON determines that there is a demand on the driving force equal to or larger than predetermined value Ts (the vehicle is to be started), the routine goes to a step S3. At step S3, controller CON activates forward brake F/B to stop ring gear Rs. At this time, Ravigneaux type planetary gear set 2 has the revolution from engine ENG to ring gear Rd outputted as the revolution in the forward (positive) direction through carrier C which is an output element Out, as shown by an alignment chart of A1 in FIG. 9. At the output torque, in this case, with the lever ratio with line A1 as a lever, a forward brake F/B as a fulcrum, with engine ENG as a power point, and with output (Out) as a point of application, the torque from engine ENG is amplified. The output torque is represented by a value, the torque of engine ENG being amplified. Consequently, a large torque requested during the start of vehicle can be obtained from engine output without resort to a large sizing of first and second motor/generators MG1 and MG2. In a state where the forward brake F/B is left activated, it is almost impossible to raise the revolution due to a revolution limit of engine ENG even if the Output (Out) revolution from carrier C is tried to be raised largely.

Therefore, if controller CON determines that the larger driving force is not demanded (No) at step S2, the routine goes to a step S4 at which forward brake F/B is not activated (deactivated) so that ring gear Rs is freely rotatable. Even if, at this time, the revolution of engine ENG is the same, the drive of motor/generator MG1 in the positive direction (normal direction) revolution output can largely raise the output (Out) revolution from carrier C. A worsening of fuel consumption can be avoided.

Figure 5:
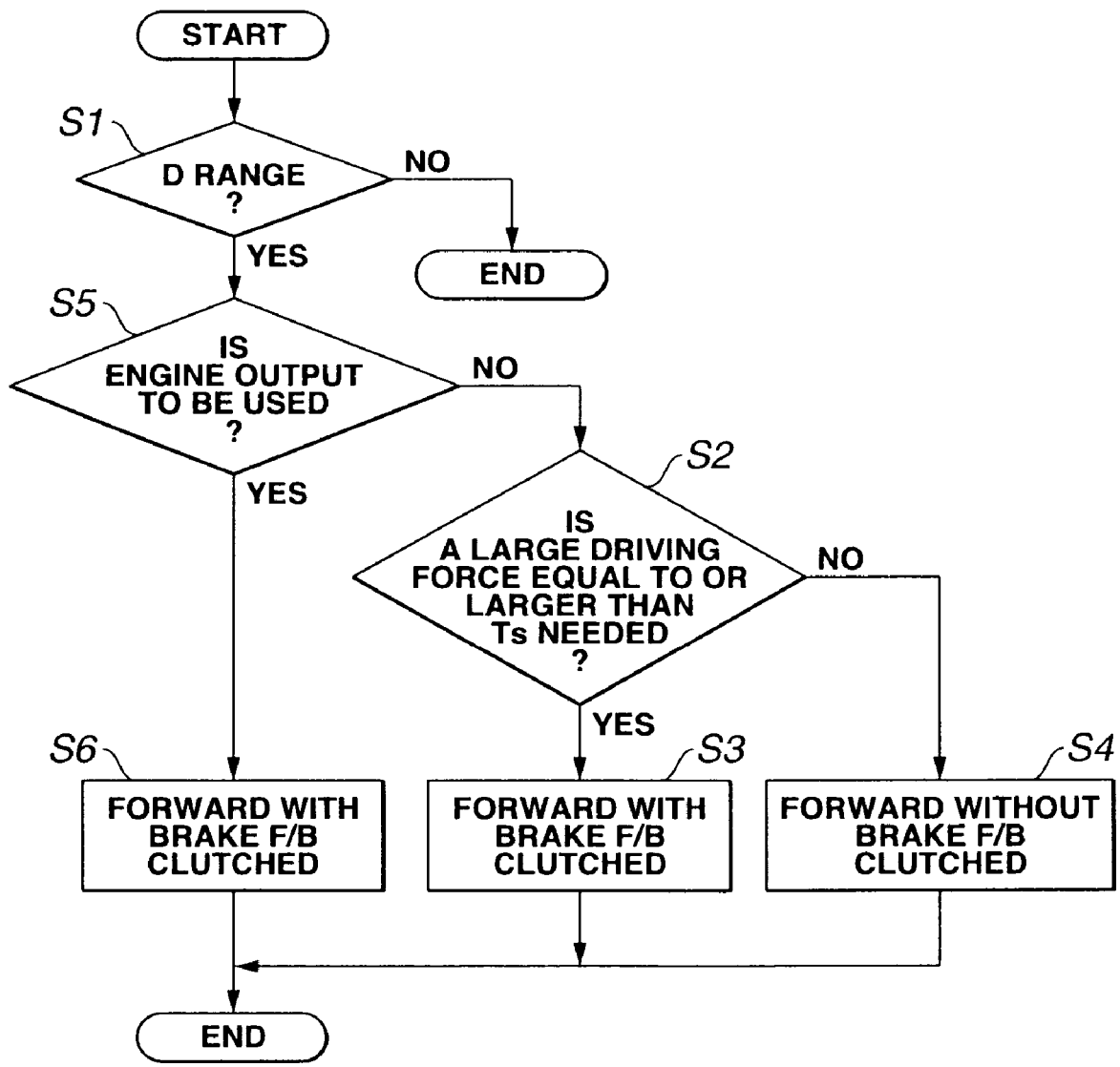
FIG. 5 is an operational flowchart representing a first modification of the transmission gear control program executed in the transmission controller shown in FIG. 4.

FIG. 5 shows a variation of the transmission gear operation when hybrid transmission shown in FIG. 1A outputs the forward (normal or positive) revolution is outputted. The same step numbers shown in FIG. 5 as those shown in FIG. 4 designate the like processes.

In this variation, when controller CON determines the forward run (D range) and, at a step S5, determines the forward run without use of engine output, viz., first and second motor/generators MG1 and MG2 are driven for the vehicle to be forwarded, the same control processes are carried out at steps S2 through S4 in the same way as shown in FIG. 4.

At step S5 shown in FIG. 5, if controller CON determines that the engine output is used for the vehicle to be forwarded, the routine goes to a step S6 at which the forward brake F/B unconditionally activates forward brake F/B to amplify the torque of engine ENG. Consequently, the required driving force can be obtained from engine output without resort to the large sizing of motor/generators MG1 and MG2.

Figure 6:
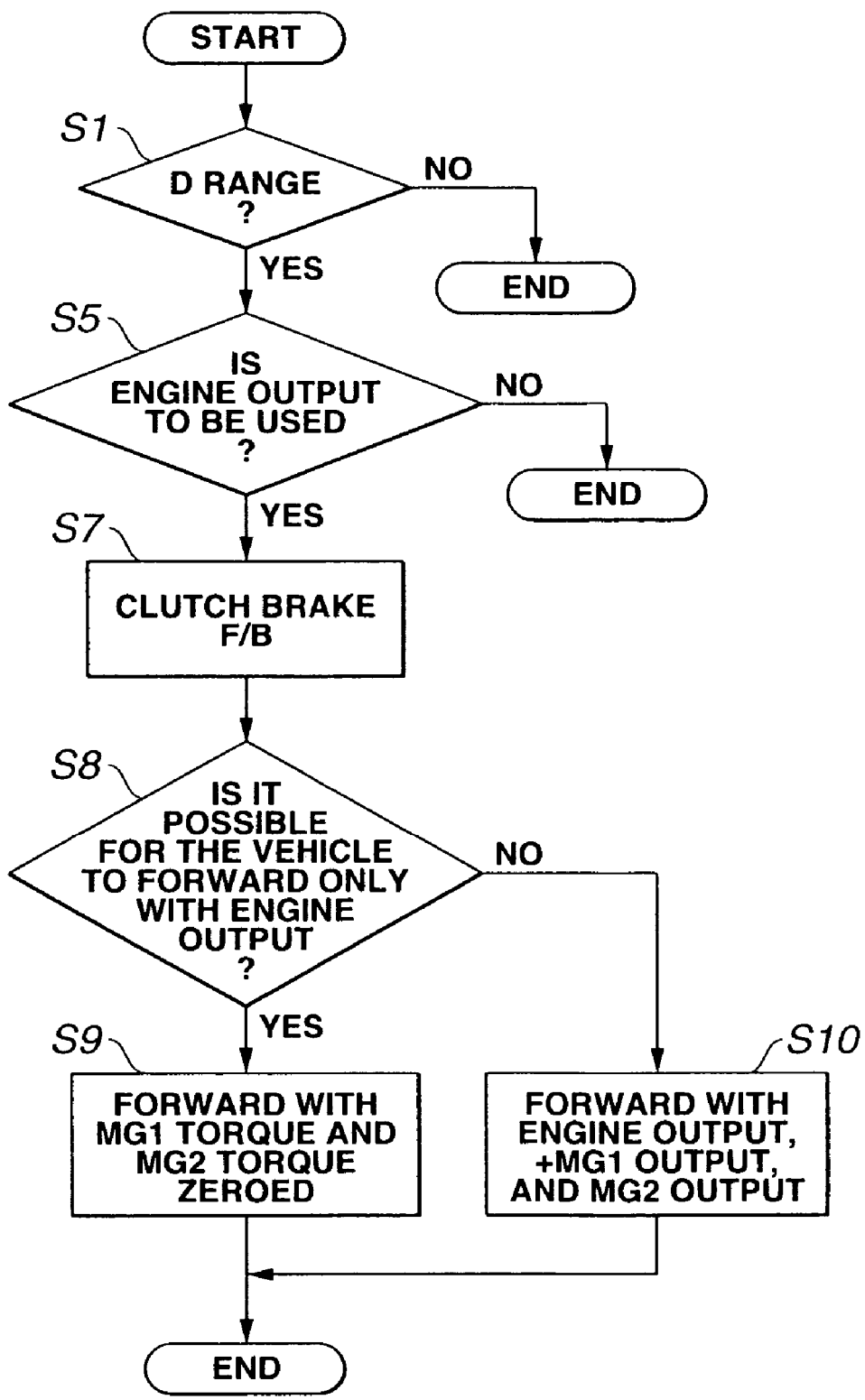
FIG. 6 is an operational flowchart representing a second modification of the transmission gear control program executed in the transmission controller shown in FIG. 4.

FIG. 6 shows another variation of the transmission gear operation when hybrid transmission outputs the forward (normal) revolution. The same step numbers shown in FIG. 6 as those shown in FIGS. 4 and 5 designate the like step numbers. In this variation, when controller CON determines that the transmission is in the forward run (D) range at step S1 and determines the forward run with no use of engine output, namely, controller CON determines that the drive of the first and second generators MG1 and MG2 causes the vehicle to be forwarded, the control is directly ended.

At step S5, controller CON determines that the engine output is used for the vehicle to be forwarded. At a step S7, controller CON unconditionally activates forward brake F/B so as to enable the torque amplification through the above-described lever ratio. Next, at a step S8, controller CON determines whether the vehicle can be forwarded only by the engine output. If Yes, the routine goes to a step S9. The motor/generators MG1 and MG2 render zero output torque in a non-active state so that the forward run only by the engine output is carried out. If No at a step S7, the routine goes to a step S10. At step S10, the vehicle forward run is carried out by the engine output and by the outputs of motor/generators MG1 and MG2. Thus, in spite of the fact that the forward run is possible only with the engine output if the engine output is amplified, such a wasteful power utilization that the power from each of motor/generators MG1 and MG2 is added and outputted can be eliminated. Consequently, the fuel consumption can be improved.

Figure 7:
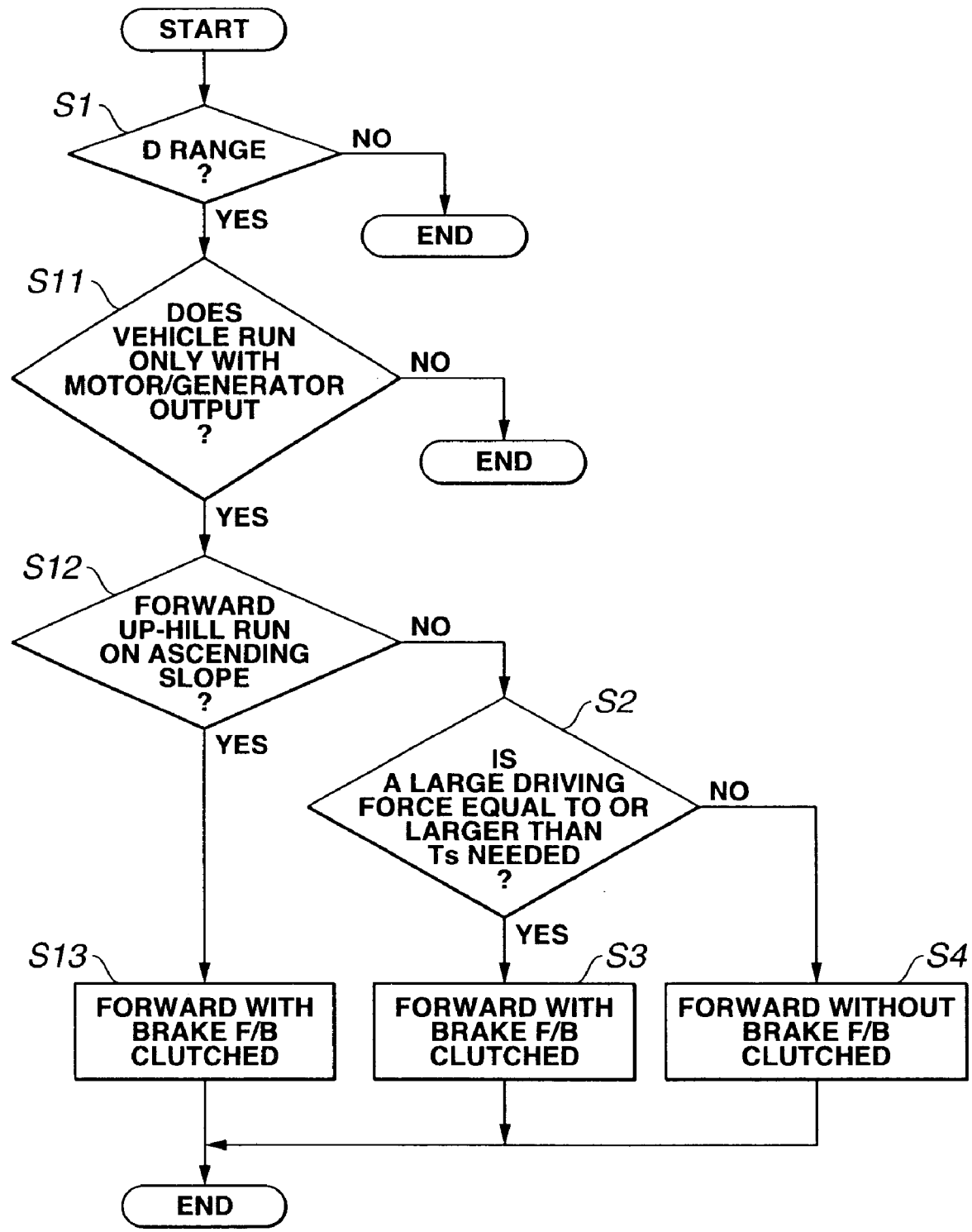
FIG. 7 is an operational flowchart representing a third modification of the transmission gear control program executed in the transmission controller shown in FIG. 4.

FIG. 7 shows a still another variation of the transmission gear operation when hybrid transmission 1 shown in FIG. 1A outputs the forward (normal or positive) revolution. The same step numbers in FIG. 7 as those shown in FIGS. 4, 5, and 6 designate like processes.

In this variation, the following control is carried out when controller CON determine the forward run (D) range at step S1 and determines the forward run only by the drive of both of first and second motor/generators MG1 and MG2 at step S11. That is to say, controller CON determines whether the vehicle is to be forwarded on an ascending slope. If determining that there is no run of forwarding the ascending slope, the same control procedures as steps S2 through S4 shown in FIG. 4 are carried out. However, when determining that the vehicle is to be forwarded on the ascending slope, controller CON can activate forward brake F/B unconditionally at a step S13 and forwards the vehicle. According to the control variation, when the vehicle stops while forwarding on the ascending slope, the activation of forward brake F/B and engine ENG can serve to maintain the stopped state of the vehicle. Thereafter, it is not necessary to release a parking brake (not shown) when the vehicle is started from the stopped state. The depression of only accelerator pedal can easily achieve the vehicular start. It is noted that, in hybrid transmission 1 shown in FIG. 1A, single planetary gear set 4 is disposed at the side near to motor/generators MG1 and MG2 and double pinion planetary gear set 5 is disposed toward engine side ENG. Hence, since single pinion planetary gear set 4 is smaller in diameter than double pinion planetary gear set 5, connection structure of two motor/generators MG1 and MG2 to Ravigneaux type planetary gear set 2 (differential unit) can be simplified as shown in FIG. 1A.

Figure 3:
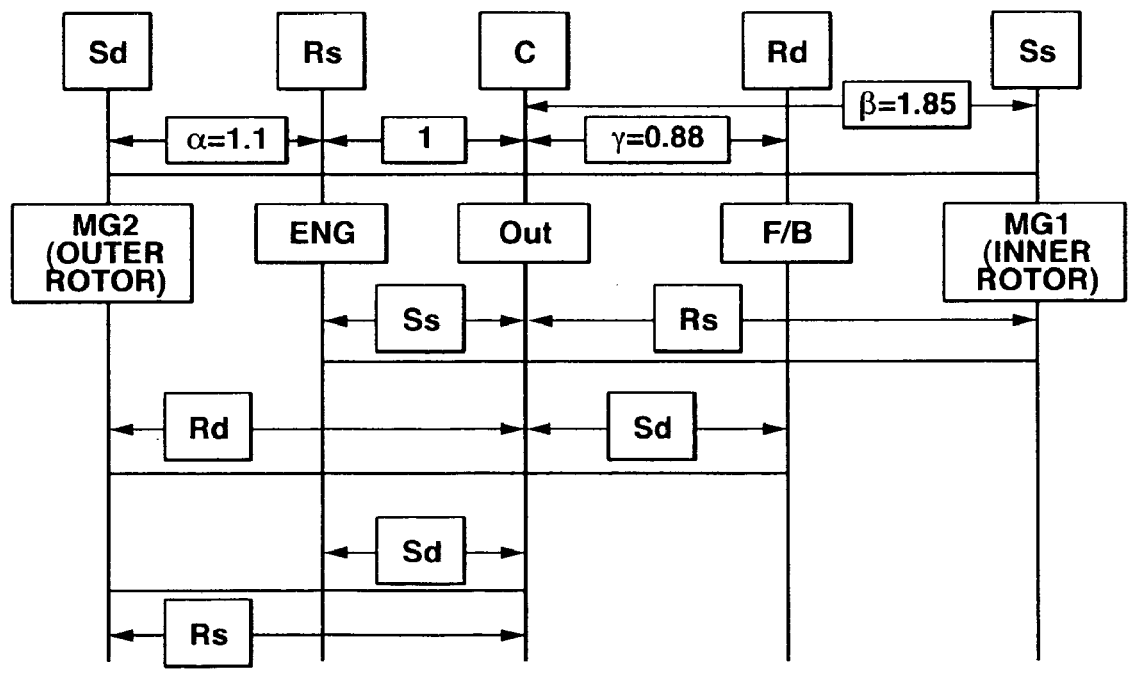
FIG. 3 is an alignment chart of a comparative example of an inverse arrangement of the hybrid transmission shown in FIG. 1A for explaining advantages exhibited by the hybrid transmission shown in FIG. 1A.
Figure 8A:
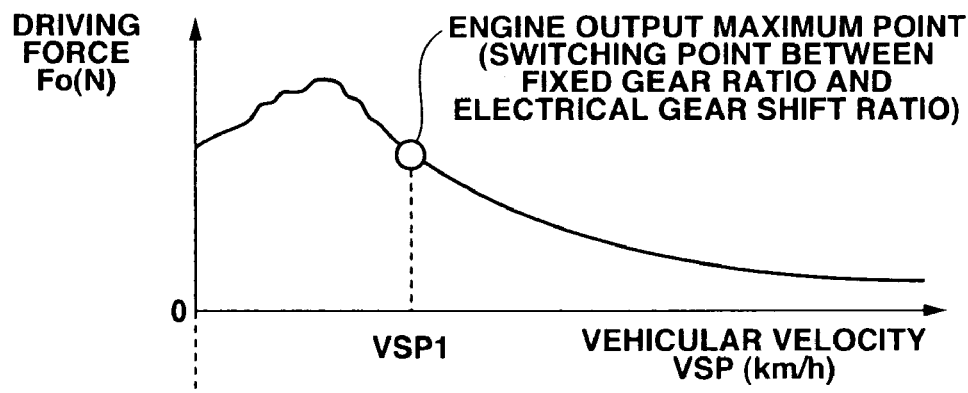
FIGS. 8A and 8B are integrally a timing chart for explaining the transmission operation during the forward revolution output state.
Figure 8B:
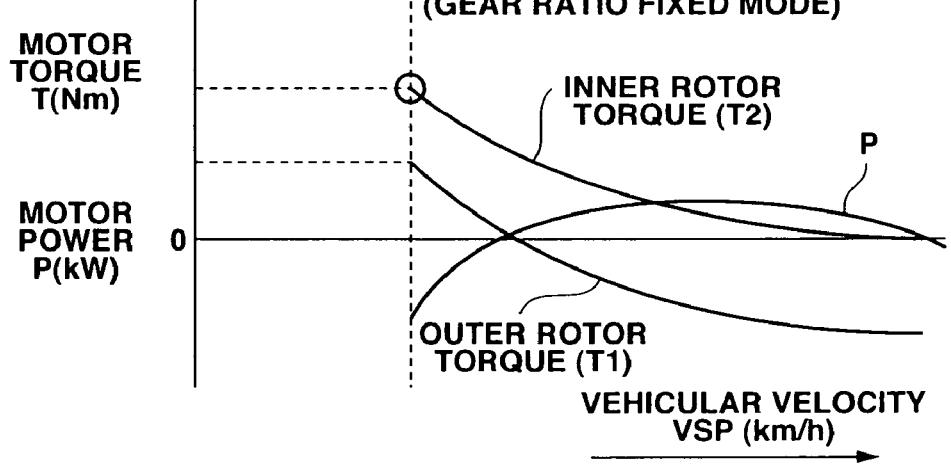

FIGS. 8A and 8B show an operational characteristic of hybrid transmission 1 shown in FIG. 1A when the vehicle is started under a constant opening angle of an engine throttle valve. While a vehicular velocity VSP becomes a vehicular velocity value of VSP1 corresponding to engine output maximum point, the activation of forward brake F/B causes gear ratio fixed mode to be functioned as a gear ratio fixed mode. At a brake clutch/release point at which the vehicular velocity VSP reaches to VSP1, forward brake F/B is deactivated and the mode is switched to an electrical gear ratio mode. In this case, as a ratio of a torque required to the motor to engine torque (a torque required to take a balance on the alignment chart), variation characteristic of outer rotor torque T1 and inner outer torque T2 are shown together with the variation characteristic of motor power P. As shown in FIG. 1A, single pinion planetary gear set 4 is disposed at the side of motor/generators MG1 and MG2. In addition, double pinion planetary gear set 5 is disposed toward engine side ENG. In this case, a relationship of $(1+\alpha)<\beta$ between $\alpha$ and $\beta$ is established. At the corresponding arrangement, when the above-described numerical value example of $\alpha=1.1$, $\beta=2.4$, and $\gamma=1.14$ are applied in the arrangement shown in FIG. 1A. Outer rotor torque T1 at brake clutch/release point VSP1 shown in FIGS. 8A and 8B indicates 0.26 as shown in FIG. 9, outer rotor torque T2 in VSP1 indicates 0.64 as shown in FIG. 9, and a motor power P in VSP1 indicates 0.39 as shown in FIG. 9. As against FIG. 1A, positions of single pinion planetary gear set 4 and double pinion planetary gear set 5 are exchanged with each other and arranged so that its alignment chart is formed as shown by FIG. 3. In this case, a relationship of $(1+\alpha)>\beta$ is established between $\alpha$ and $\beta$. If numerical examples of $\alpha=1.1$, $\beta=1.85$, and $\gamma=0.88$ are applied, as shown in FIG. 9, to this arrangement, outer rotor torque T1 at brake clutch/release point indicates 0.29 as shown in FIG. 9. Inner rotor torque T2 indicates 0.86 as shown in FIG. 9. Motor power P indicates 0.41 as shown in FIG. 9. As is apparent from the comparison between columns on $(1+\alpha)>\beta$ and columns on $(1+\alpha)<\beta$, according to the arrangement of single pinion planetary gear set 4 and double pinion planetary gear set 5, as compared with the case where they are replaced with each other. Outer rotor torque T1 can be reduced from 0.29 to 0.26 by a rise in revolution speeds of N1 and N2, inner rotor torque T1 can be reduced from 0.29 to 0.26, outer rotor torque T2 can be reduced from 0.86 to 0.64, and motor power P can be reduced from 0.41 to 0.39. Hence, hybrid transmission shown in FIG. 1A can improve a power performance during the vehicular start under the forward revolution output state and without enlargement of the capacities of motor/generators MG1 and MG2, viz., without resort to the large sizing of motor/generators MG1 and MG2. The brake release/clutch point VSP1 shown in FIG. 8 is shifted toward rightward direction of vehicular velocity (VSP) as $\gamma$ becomes large. According to the arrangement of single pinion planetary gear set 4 and double pinion planetary gear set 5, $\gamma$ becomes large as compared with the inverse arrangement of these couples 4 and 5. Hence, all of outer rotor torque T1, inner rotor torque T2, and motor power P can be reduced.

In addition, as shown in FIG. 1A, in a case where motor/generators MG1 and MG2 are disposed on axial ends at the side of Ravigneaux type planetary gear set 2 (differential unit), there are many cases when a large-sized obstacle such as a differential gear unit at the surrounding of the axial end described above. An arrangement space of each of the first and second motor/generators MG1 and MG2 which are large-sized parts can easily be secured and a degree of freedom in design of the hybrid transmission can be increased.

Figure 10:
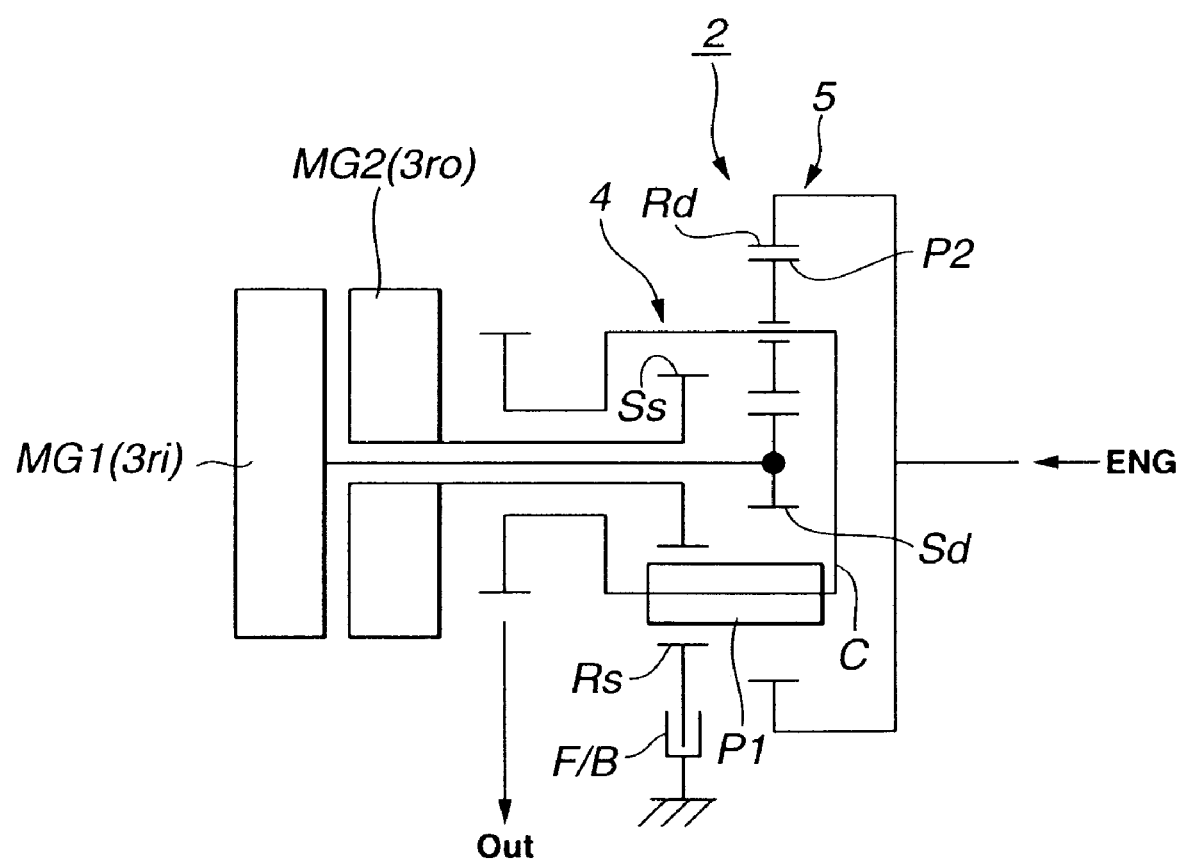
FIG. 10 is a rough diagram of another example of motor/generators which may be used in the hybrid transmission shown in FIG. 1A.

In FIG. 1A, motor/generators MG1 and MG2 are constituted by compound current driven two-layer motor 3 having inner rotor 3$ri$, circular outer rotor 3$ro$ enclosed by inner rotor 3$ri$, and stator 3$s$ coaxially arranged in a circular space between inner and outer rotors 3$ri$ and 3$ro$. However, alternatively, as shown in FIG. 10, rotors 3ri and 3ro may be arranged laterally (or vertically) onto the coaxial line direction. However, in the alternative case, both of the first and second motor/generators, viz., inner rotor and outer rotor 3ri and 3ro are arranged to be coaxial to Ravigneaux type planetary gear set 2 (differential unit). Thus, a diameter (radial) direction of the hybrid transmission can be compacted.

Figure 11:
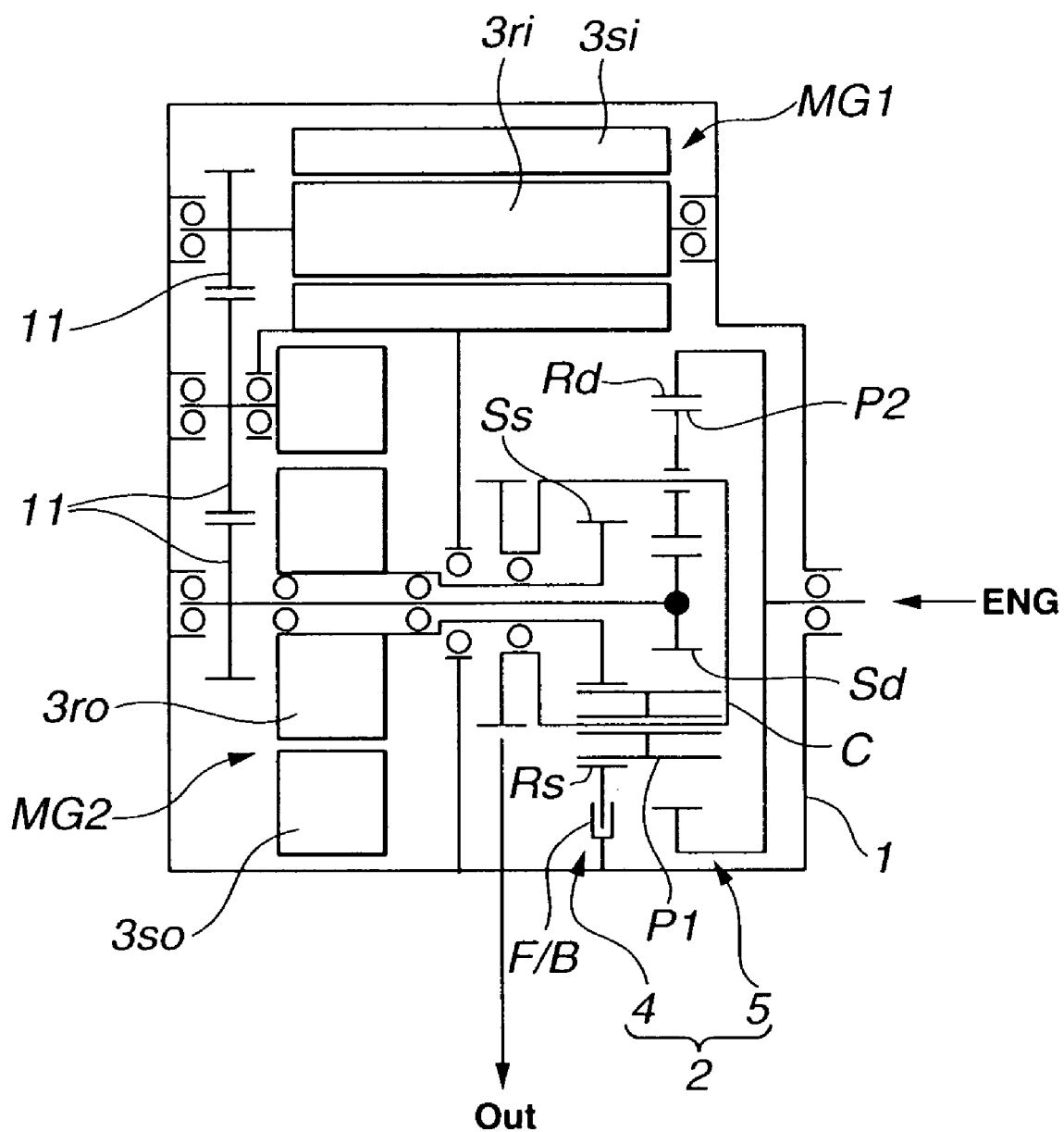
FIG. 11 is a rough diagram of a still another example of motor/generators which may be used in the hybrid transmission shown in FIG. 1A.

FIG. 11 shows a second preferred embodiment of the hybrid transmission. As shown in FIG. 11, each of motor/generators MG1 and MG2 is not coaxial but one of them is offset in the diameter direction to the other. In the second embodiment, second motor/generator MG2 is constituted by rotor 3ro and stator 3so is coaxially arranged to Ravigneaux type planetary gear set 2. Motor/generator MG1 related to sun gear Sd is constituted by inner rotor 3ri and stator 3si arranged on a sub axial line offset from Ravigneaux type planetary gear set 2. Then, drive axle connected to sun gear Sd is penetrated through rotor 3ro of second motor/generator MG2. A drive coupling is carried out through a gear row 11 between the drive axle and rotor 3ri of first motor/generator MG1. In this way, according to the structure in which first and second motor/generators MG1 and MG2 are mutually radially offset, the degree of freedom in the arrangement of both of first and second motor/generators MG1 and MG2. Except the structure shown in FIG. 11, a necessity of penetrating the axle of motor/generator MG1 related to sun gear Sd through rotor 3ro of motor/generator MG2 is eliminated so that a large volume of rotor 3ro of second motor/generator MG2 can be achieved. Consequently, the driving torque of second motor/generator MG2 can be augmented.

Figure 12A:
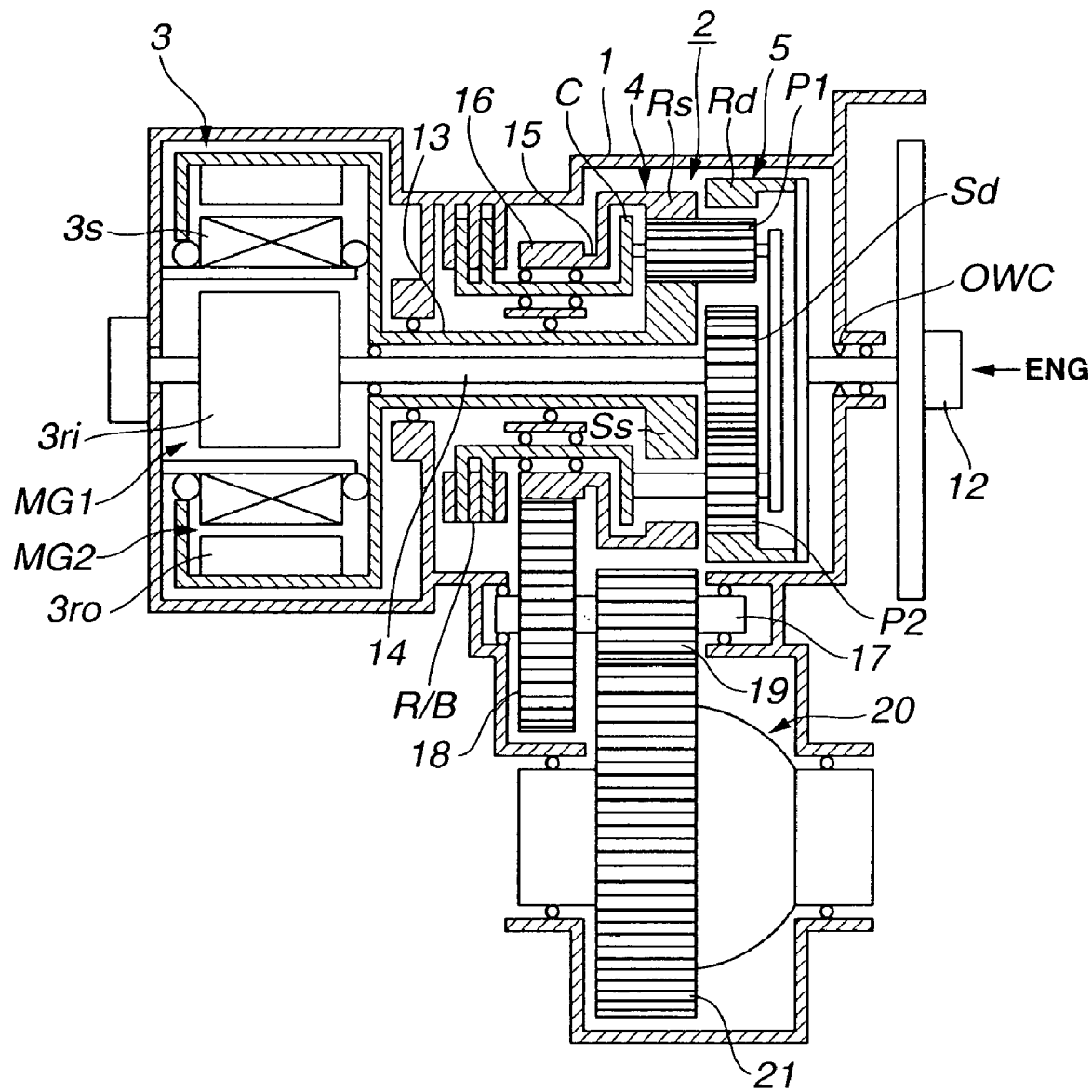
FIG. 12A is a rough longitudinal cross sectional side view of the hybrid transmission in a second preferred embodiment according to the present invention.
Figure 12B:
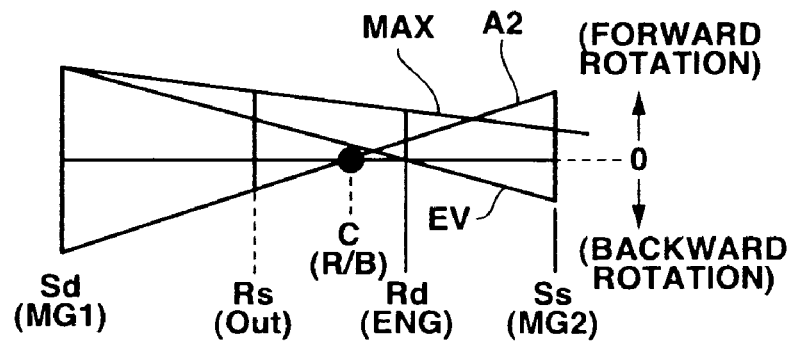
FIG. 12B is an alignment chart of the hybrid transmission shown in FIG. 12A.

FIGS. 12A and 12B show a third preferred embodiment of hybrid transmission according to the present invention which can achieve the object of the present invention under a reverse (backward) revolution output state. In this embodiment, the hybrid transmission is applicable to the transaxle for the front-engine, front-drive vehicle (FF car). In FIG. 12(A), reference numeral 1 denotes transmission casing, Ravigneaux type planetary gear set 2 is incorporated in housing 1 at the engine side ENG (primary power source) in the axial line direction of transmission casing 1 (leftward and rightward directions of FIG. 12A) and motor/generator couple (first and second motor/generators MG1, MG2) constituted by, for example, compound current driven two-layer motor 3 is incorporated in housing 1 at the rear end opposite side to planetary gear set 2. It is noted that Ravigneaux type planetary gear set 2 and compound current driven two-layer motor 3 are coaxially aligned onto the same axial line of transmission casing 1.

Ravigneaux type planetary gear set 2 is constituted by a combination of single and double pinion planetary gear sets 4 and 5 having pinion P1 and ring gear Rs commonly and having common carrier C by which all pinions P1 and P2 are rotatably supported. Single pinion planetary gear set 4 is located at compound current driven two-layer motor 3 and double pinion planetary gear set 5 is arranged at the engine side, respectively. In this way, the structure within housing 1 is generally the same as that shown in FIG. 1A.

Hence, in this embodiment, Ravigneaux type planetary gear set 2 constitutes main elements of five rotary members of sun gear Ss, sun gear Sd, ring gear Rs, ring gear Rd, and carrier C and constitutes a two-degree of freedom differential unit in which, when revolution speeds of two of five members are determined, the revolution speeds of the other members are determined.

In addition, compound current driven two-layer motor 2 includes inner rotor 3ri, outer rotor 3ro, and a stator 3s in the same way as shown in FIG. 1A. Inside first motor/generator MG1 is constituted by circular coil 3 and inner rotor 3ri. Outside second motor/generator MG2 is constituted by circular coil 3s and outer rotor 3ro.

Ravigneaux type planetary gear set 2 includes the five rotary members described above, first motor/generator MG1, road wheel drive system output (Out), backward reverse brake R/B, an input from engine ENG which is a main power source, and motor/generator MG2 are connected in the revolution order of sun gear Sd, ring gear Rs, carrier C, ring gear Rd, and sun gear Ss.

The above-described connection will be explained with reference to FIG. 12A in more details. In order to provide ring gear Rd for input element to which the engine revolution is inputted, this ring gear Rd is connected to crankshaft 12 of engine ENG and ring gear Rd is disabled to rotate in the reverse direction to the engine revolution through one-way clutch OWC. Sun gear Ss is connected to second motor/generator MG2 (in details, outer rotor 3ro) via a hollow axle 13. Sun gear Sd is connected to motor/generator MG1 (in details, inner rotor 3ri) via axle 14 to which the hollow axle 13 is loosely fitted. Then, carrier C is enabled to appropriately be braked with a reverse brake R/B. In order to provide ring gear Rs, as described above, for an output element which outputs the revolution to road wheel drive system, an output gear 16 is connected to ring gear Rs via hollow axle 15 and this output gear 16 is meshed with a counter teeth 18 on a counter shaft 17. A final drive pinion 19 is integrally mounted on counter shaft 17 and is meshed with final drive ring gear 21 installed on differential gear 20.

An output revolution from the transmission is transmitted via a final drive gear pinion 19 and final drive ring gear 21 to differential gear 20. The differential gear serves to distribute the output revolution to left and right driven wheels. The hybrid transmission described above carries out the gear shift operation as shown in an alignment chart shown in FIG. 12B. First, the transmission gear operation when the transmission falls in the forward (positive or normal) revolution output state. At this time, with reverse brake R/B made undriven, carrier C is enabled to be in the free rotatable state.

As shown by EV line on the alignment chart, engine ENG is stopped, the first motor/generator MG1 is driven in the reverse revolution output direction so that the forward (positive or normal) direction revolution can be outputted from ring gear Rs. Thus, an electrical run by means of only motor/generators MG1 and MG2 becomes possible.

If engine driving is carried out, a transition from EV line on the alignment chart to MAX line can raise the forward (positive) directional revolution from ring gear Rs.

Next, the transmission gear operation when the backward (reverse) revolution output state occurs in the hybrid transmission according to the present invention will be described below. At this time, reverse brake R/B is operated, carrier C is stopped, first motor/generator MG1 is driven in the reverse revolution output direction, and second motor/generator MG2 is driven in the normal revolution output direction. The drives of motor/generators MG1 and MG2, as shown in A2 on the alignment chart of FIG. 12B, cause ring gear Rs which is an output element together with the engine drive (positive) revolution output to output a backward (reverse) direction revolution.

An output torque, at this time, at a lever ratio with a line A2 as a lever, reverse brake R/B as a fulcrum, first motor/generator MG1, second motor/generator MG2, and engine ENG on a power point, and output (Out) as a point of application, serves to represent a sum of values of amplifying motor/generators torques MG1 and MG2 and engine ENG torque so that a large torque required during the backward drive can be generated.

Consequently, under a state in which the electrical income and outgo become balanced, the drive becomes possible. When reverse brake R/B is activated when the vehicle in which the vehicle is to be stopped from a state in which the reverse run only by motor/generators MG1 and MG2 is carried out, the activation of reverse brake R/B and one-way clutch OWC make output side (Out) forward revolution disabled so that the vehicle can maintain the vehicular stop state. In a case where the backward restart after the vehicle is stopped in the backward state on an ascending slope, a manipulation of a brake pedal becomes unnecessary and the vehicular start can be facilitated.

The transmission gear control when the transmission is under the backward (reverse) revolution output state will be described with reference to FIGS. 16 through 19. At a step S21 shown in FIG. 16, if controller CON determines that a reverse run (R) range is carried out (Yes) and, at a step S22, determines that the large driving force equal to or larger than predetermined driving force Ts due to the run on the curb or the step (the vehicle is to be started), the routine shown in FIG. 16 goes to a step S23. At step S23, controller CON activates reverse brake R/B and stops carrier C. At this time, Ravigneaux type planetary gear set 2 causes the revolution of ring gear Rd from engine ENG to be outputted as the revolution in the forward (positive) direction from ring gear Rs which is the output element Out. The output torque thereat is represented by the value of the engine ENG torque amplified with a lever ratio with line A2 as the lever, reverse brake R/B as the fulcrum, engine ENG as the power point, and out (Out) as the point of application. A large torque required due the vehicular start can be achieved from engine output without resort to the enlargement of the size of these motor/generators MG1 and MG2. It is noted that, if the activation of reverse brake R/B is maintained, the revolution rise cannot be achieved due to a revolution limit of engine ENG even if the output revolution from ring gear Rs is tried to be raised largely. Therefore, if controller CON determines that the large driving force is not demanded (No) at step S22, the routine shown in FIG. 16 goes to a step S24 at which reverse brake R/B is made undriven and carrier C is enabled to be freely rotated. At this time, even if the revolution of engine ENG is the same, both of the first and second motor/generators MG1 and MG2 are driven in the direction at which the revolution speed is augmented in the same revolution direction and the output revolution (Out) from ring gear Rs can largely be raised. Then, the worsening of the fuel consumption can be avoided.

Figure 16:
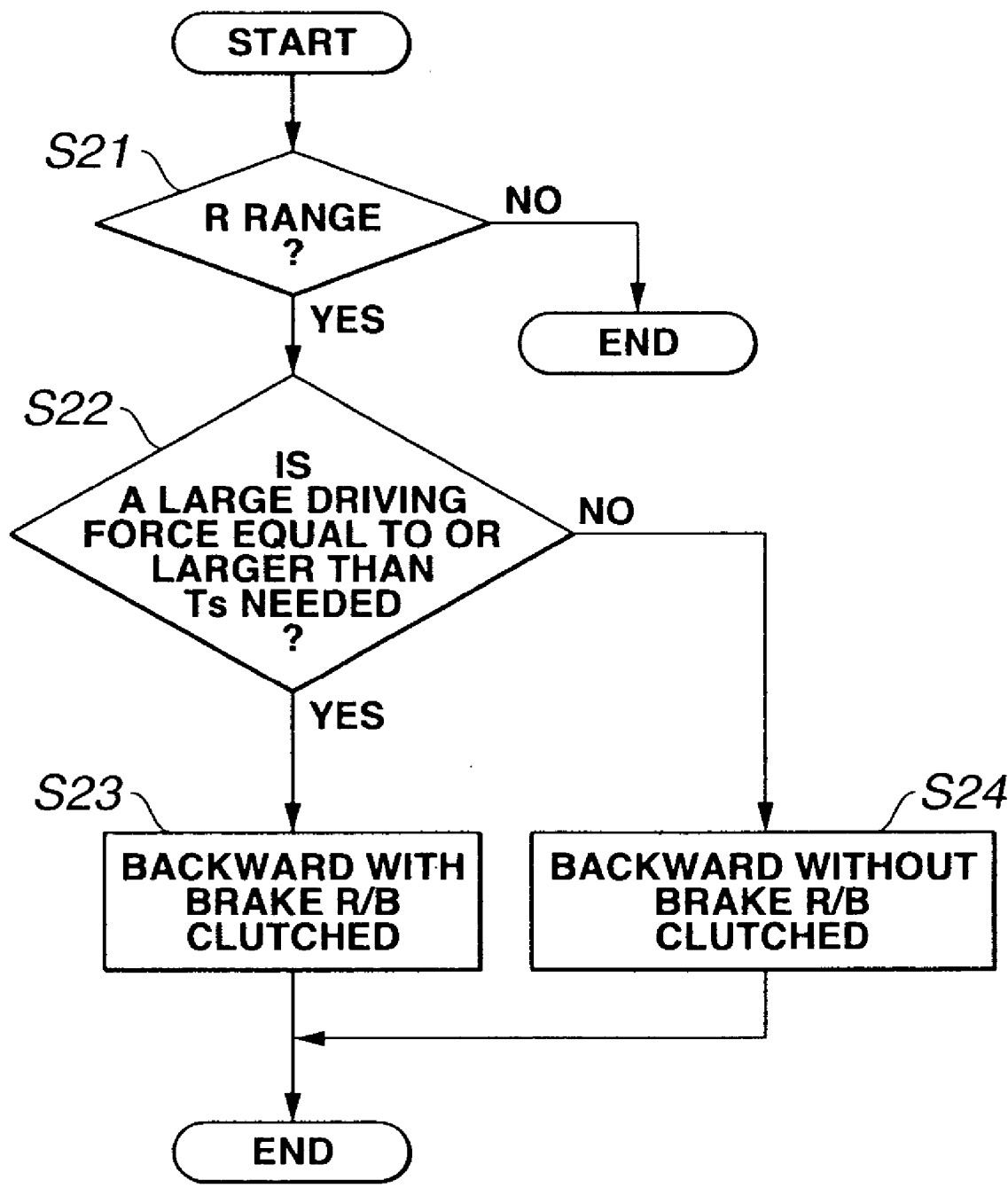
FIG. 16 is an operational flowchart representing a transmission gear control program when the hybrid transmission shown in each of FIGS. 12 through 15 is under a backward revolution output.
Figure 17:
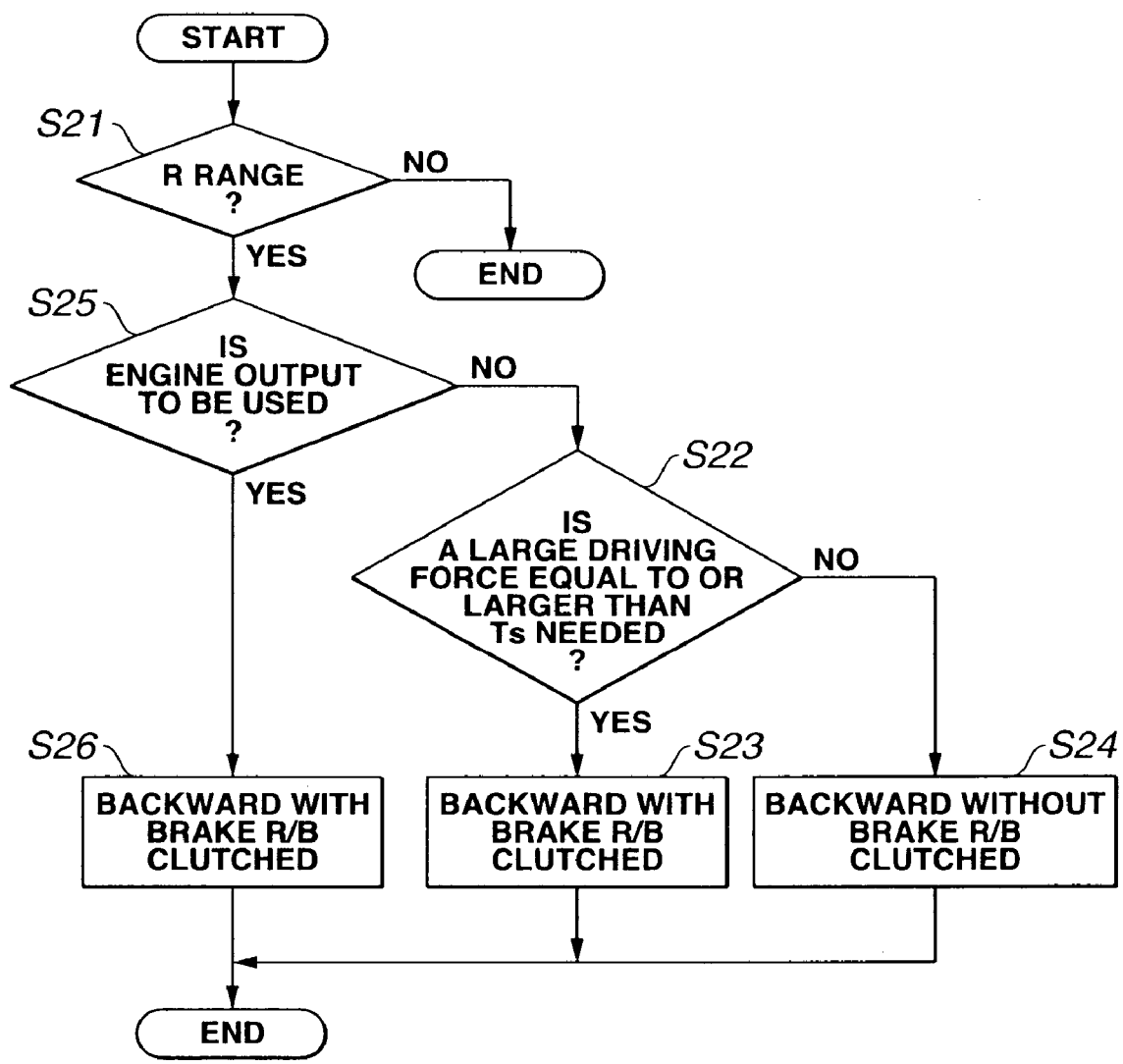
FIG. 17 is an operational flowchart representing another modification of the transmission gear control program shown in FIG. 16.

FIG. 17 shows a further variation of the transmission gear control when hybrid transmission shown in FIG. 12A outputs the backward (reverse) revolution. The same step numbers in FIG. 17 as those shown in FIG. 16 function the same processes. In this variation, when controller CON determines, at step S21, that the gear speed range falls in the reverse run (R) range and, at step S25, the backward run without use of engine output ENG is carried out, viz., the vehicle is in the reverse run (backward run) by means of the drives of either first motor/generator MG1 or second motor/generator MG2, the same series of processes as those shown in FIG. 16 are carried out at steps S22 through S24 and, at a step S25, when controller CON determines that the vehicle is in the backward run using the engine output, at a step S26, controller CON unconditionally activates reverse brake R/B to amplify the torque of engine ENG. Thus, the requested driving force from engine output can be achieved without resort to the enlargement of the size of first and second motor/generators MG1, MG2.

Figure 18:
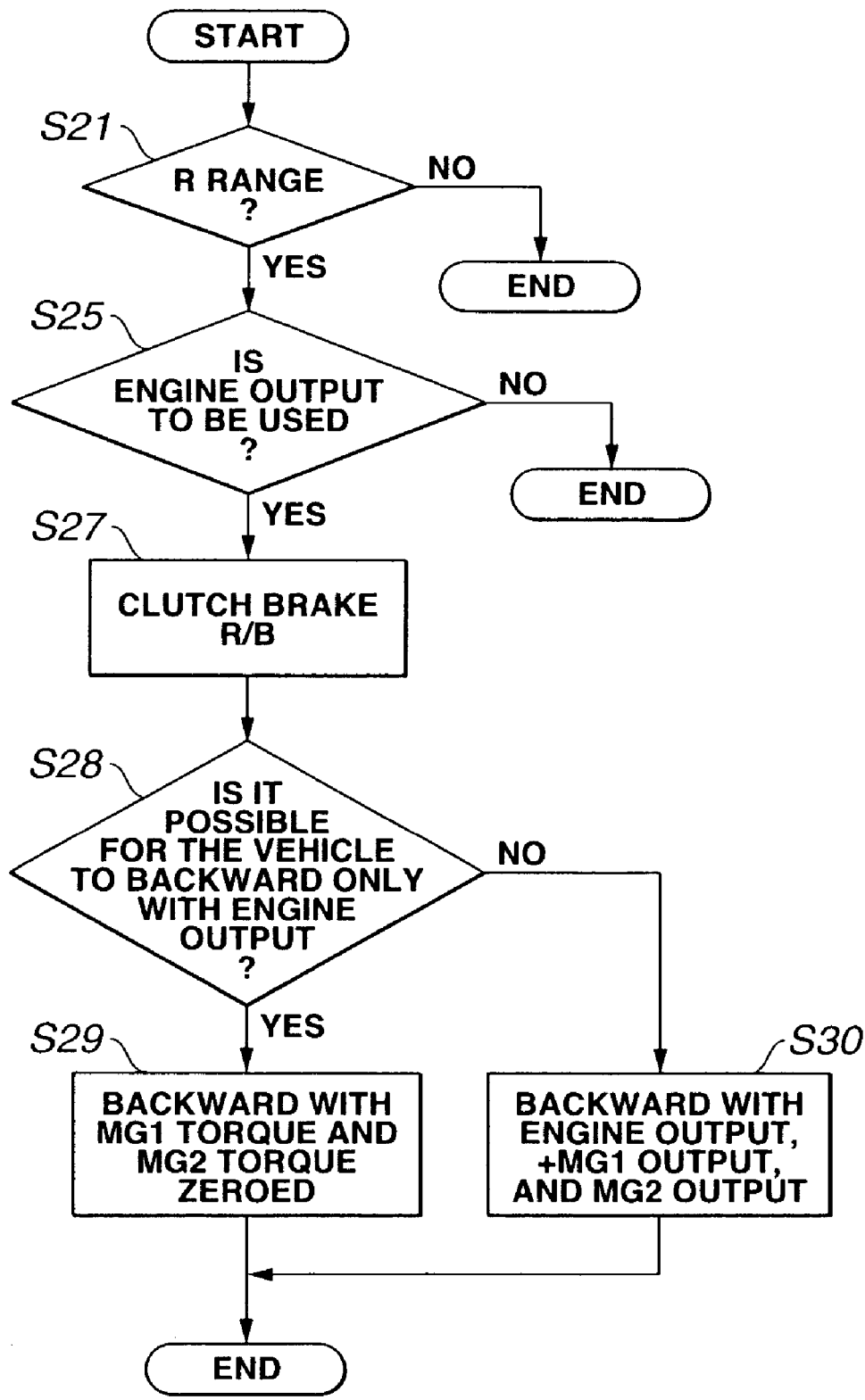
FIG. 18 is an operational flowchart representing another modification of the transmission gear control program shown in FIG. 16.

FIG. 18 shows a still another variation of the transmission gear control when the hybrid transmission shown in FIG. 12 outputs the backward (reverse) revolution. The same step numbers in FIG. 18 as those shown in FIGS. 16 and 17 carry out the same processes as those shown in FIGS. 15 and 17.

In this variation, when controller CON, at step S21, determines that the transmission is in the backward run range (R range) and determines, at step S25, that the vehicle is in the forward run without use of the engine output, in other words, when the drives of first motor/generator MG1 and/or second motor/generator MG2 cause the vehicle to carry out the backward run, the control routine shown in FIG. 18 is directly ended. If controller CON determines that the vehicle is in the forward run using the engine output at step S25, the routine goes to a step S29 at which controller CON activates unconditionally reverse brake R/B so as to enable the amplification of the torque by means of the above-described lever ratio.

Next, at a step S28, controller CON determines whether the vehicle is enabled to run backward only through the engine ENG output. If possible (Yes) at step S28, the routine goes to a step S29 at which, with both of first and second motor/generators MG1, MG2 made non-driven states and zero output torque, the vehicle is in the backward run (reverse) run only with the engine output. If not possible (No) at step S28, the routine goes to a step S30 at which the vehicle runs in the forward direction with the engine output and outputs of both motor/generators MG1, MG2. In the above-described variation of the transmission gear control shown in FIG. 18, such a wasteful power utilization that the power from motor/generators MG1, MG2 are additionally outputted irrespective of the fact that only by the engine output, the backward run is possible if the engine output is amplified can be eliminated. Thus, the fuel consumption of the vehicle in which the hybrid transmission according to the present invention is mounted can be improved.

Figure 19:
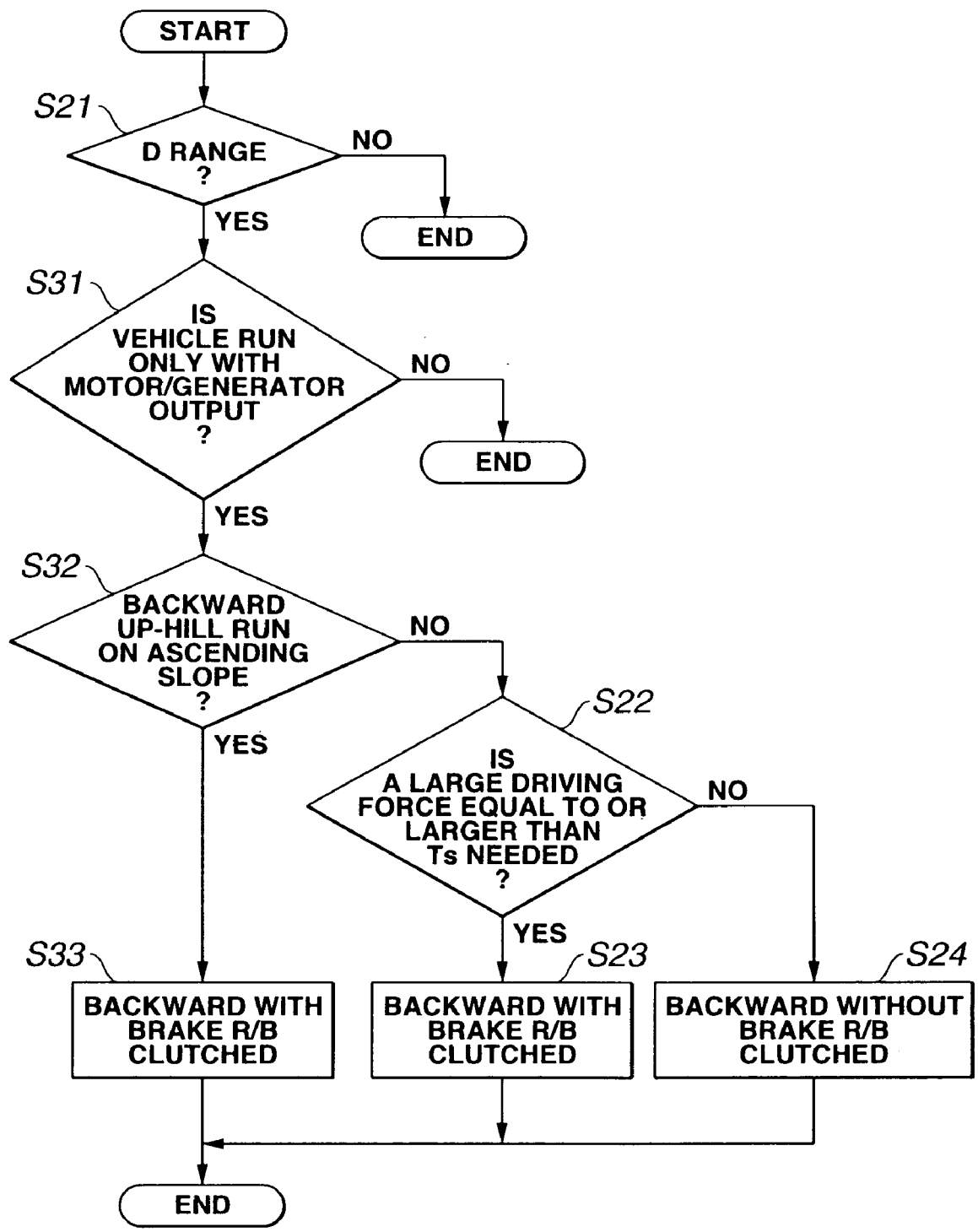
FIG. 19 is an operational flowchart representing a still another modification of the transmission gear control program shown in FIG. 16.

FIG. 19 shows a further another variation of transmission gear control when the hybrid transmission shown in FIG. 12A is outputted during the reverse (backward) run. The same step numbers shown in FIG. 19 as those shown in FIGS. 16, 17, and 18 designate the same processes as those shown in FIGS. 16 through 18. In this variation, when controller CON determines that the present gear range is in the backward run (R) range and determines, at a step S31, that the vehicle goes the backward run only by means of either the first or second motor/generator MG1 or MG2, the following control is carried out. That is to say, controller CON determines whether the vehicle runs on an ascending slope at a step S32. If controller CON determines that the vehicle is not in the backward run on the ascending slope (No) at step S32, the routine goes to step S32 and, thereafter, the same series of controls are carried out as shown in FIG. 16. However, if controller CON determines, at step S32, that the vehicle is in the backward run on the ascending slope the routine goes to a step S33 at which controller CON unconditionally activates reverse brake R/B and the vehicle runs in the backward (reverse) direction. In this variation, the stopped state can be maintained by means of the activation of reverse brake R/B and one-way clutch OWC disposed at the engine side ENG. When the vehicle is started after the vehicle is stopped state, the release of the parking brake is not needed. The vehicular start can only be varied out only through a depression of a vehicular accelerator pedal.

It is noted that, although, in FIG. 12A, sun gear Sd is coupled to inner first motor/generator MG1 (inner rotor 3ri) and sun gear Ss is coupled to second motor/generator MG2 (outer rotor 3ro), respectively, conversely, sun gear Sd may be coupled to the outer second motor/generator MG2 (outer rotor 3ro) and sun gear Ss may be coupled to inner first motor/generator MG1 (inner rotor 3ri), respectively. In this case, outer motor/generator MG2 constitutes first motor/generator according to the present invention, and inner motor/generator MG1 constitutes second motor/generator according to the present invention. The alignment chart shown in FIG. 13B corresponds to a reverse of motor/generators MG1, MG2 in FIG. 12B. However, the same action and advantages as described in the embodiment with reference to FIGS. 12A and 12B are obtained in this case.

Figure 13A:
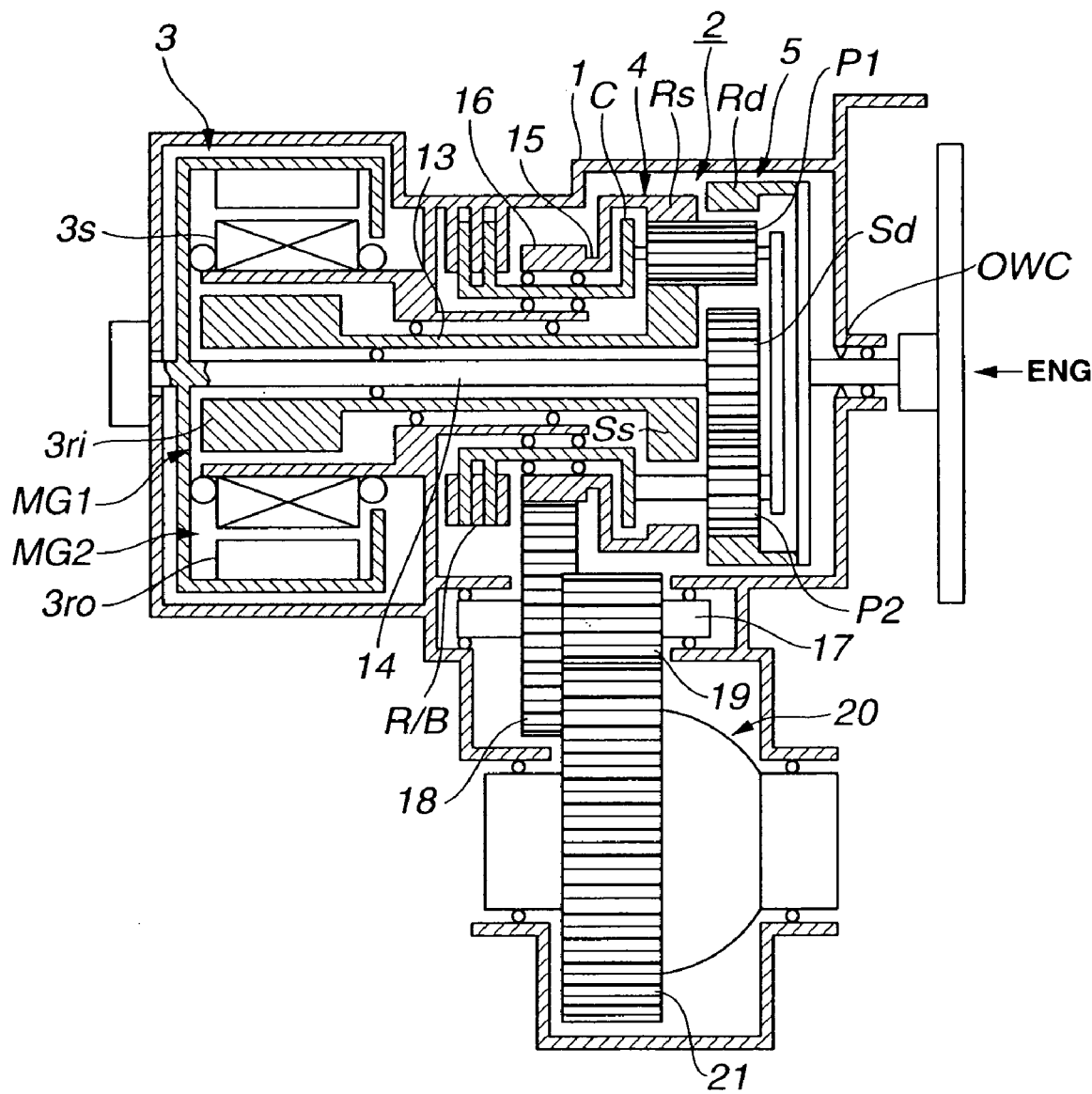
FIG. 13A is a rough longitudinal cross sectional side view of the hybrid transmission in a third preferred embodiment according to the present invention.
Figure 13B:
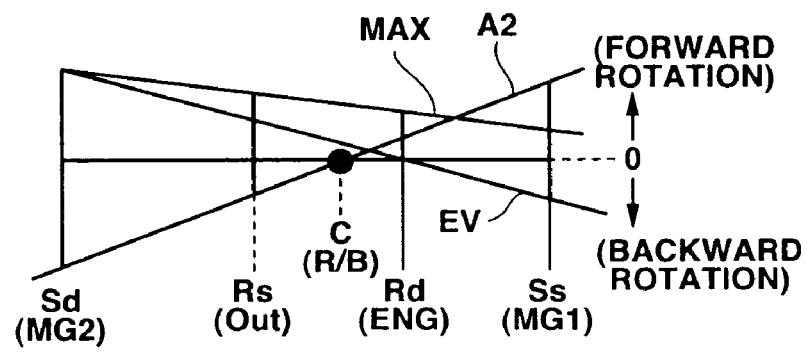
FIG. 13B is an alignment chart of the hybrid transmission shown in FIG. 13A.
Figure 14A:
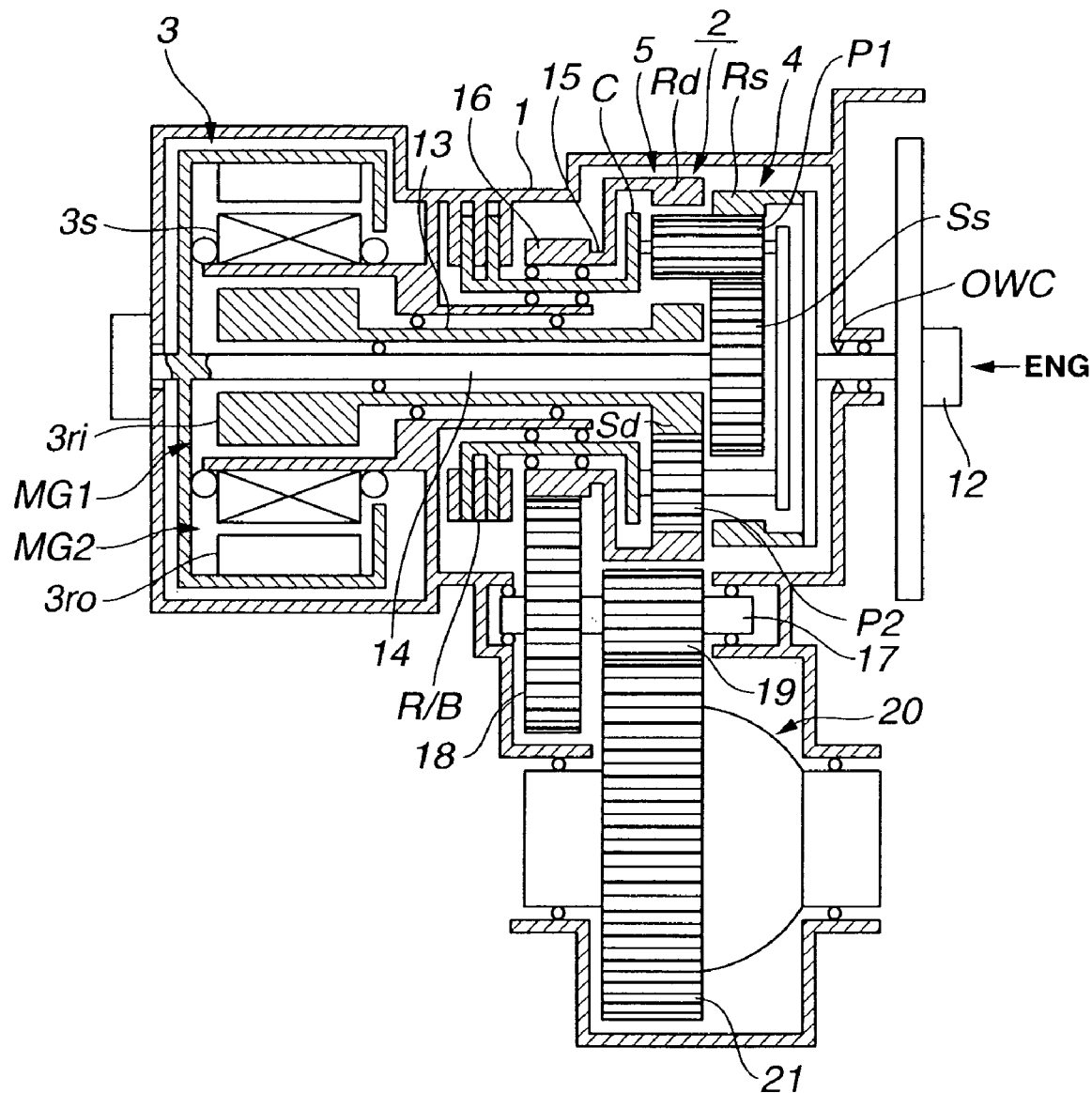
FIG. 14A is a rough longitudinal cross sectional side view of the hybrid transmission in a fourth preferred embodiment according to the present invention.

FIG. 14A shows an inverse arrangement of single pinion planetary gear set 4 and double pinion planetary gear set 5 in the hybrid transmission shown in FIG. 13A. Single pinion planetary gear set 4 is located at the right side of engine ENG in the axial direction of transmission casing 1 and double pinion planetary gear set 5 is located at the motor/generator side at the opposite side in the axial direction described above.

Figure 14B:
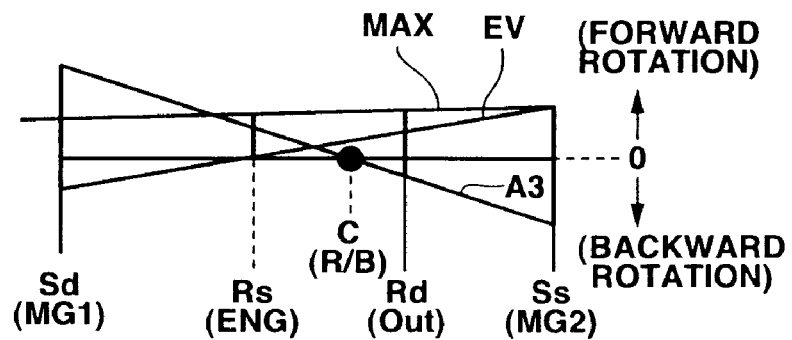
FIG. 14B is an alignment chart of the hybrid transmission shown in FIG. 14A.

Ravigneaux type planetary gear set 2 constituted by single pinion planetary gear set 4 and double planetary gear couple 5 have five rotary members of sun gear Sd, ring gear Rs, carrier C, ring gear Rd, and sun gear Ss in the revolution speed order, as shown by the alignment chart shown in FIG. 14B. Then, in this order of the rotary members, motor/generator MG1, engine ENG output which is the main power source (prime mover), backward drive reverse brake R/B, road wheel drive system out (Out), and second motor/generator MG2 are coupled. The above-described coupling will hereinafter be explained with reference to FIG. 14A.

Ring gear Rs is the input element to which the engine revolution is inputted. Hence, ring gear Rs is coupled to crankshaft 12 of engine ENG. In addition, this ring gear Rs is disabled to be rotated in the direction opposite to the engine revolution direction by means of one-way clutch OWC. Sun gear Sd is coupled to motor/generator MG1 (specifically, inner rotor 3ri) via hollow axle 13. Sun gear Ss is coupled to motor/generator MG2 (specifically, outer rotor 3ri) via axle 14 which loosely fits hollow axle 13 and inner rotor 3ri. Carrier C is appropriately enabled to be braked by means of reverse brake R/B. Ring gear Rd is the output element to output the revolution to the road wheel drive system. Hence, ring gear Rd is coupled to an output gear 16 via a hollow axle 15 so that the revolution from the transmission is passed sequentially through a counter gear 18, a counter shaft 17, a final drive pinion 19, and a final drive ring gear 21. Thus, this revolution can be distributed to left and right driven wheels (not shown) of the vehicle via differential gear 20.

In the above-described transmission shown in FIG. 14A, the following transmission gear operation is carried out with reference to the alignment chart shown in FIG. 14B.

First, the transmission gear operation when the transmission is in the forward (positive) revolution output state will be described below. It is noted that, at this time, with reverse brake R/B made undriven and carrier C enabled to be freely rotated.

With engine ENG stopped as shown by an EV line on the alignment chart shown in FIG. 14B, motor/generator MG1 driven in the reverse rotational output direction, other motor/generator MG1 driven in the reverse rotational output direction, other motor/generator MG2 driven in the positive (forward) drive direction, the rotation of ring gear Rd in the forward (positive) drive direction can be outputted. Thus, the electrical run only by means of motor/generators MG1 and MG2 become possible. It is noted that when engine ENG is driven, a transition of the line from EV line to MAX line on the alignment chart shown in FIG. 14B can raise the forward (positive) directional rotation from ring gear Rd.

Next, the transmission operation when the transmission is in the backward (reverse) revolution output state will be described below. At this time, under a state wherein reverse brake R/B is activated and carrier C is stopped, motor/generator MG1 is driven in the positive rotation output direction and second motor/generator MG2 is driven in the reverse rotation output direction. The drives of motor/generators MG1. MG2, as shown by a line A3 of alignment chart shown in FIG. 14B, the backward (reverse) directional revolution is outputted from ring gear Rd by means of engine drive (positive directional output). The output torque, at this time, of the transmission is, at a lever ratio with line A3 as the lever, reverse brake R/B as the fulcrum, motor/generators MG1, MG2 and engine ENG as power points, and output (Out) as a point of application, represented by the sum of values the which the torque from motor/generators MG1, MG2 and that from engine ENG are amplified and a large torque required during the reverse run can be developed. At this time, it is possible to carry out the electrical run only through motor/generators MG1, MG2 with engine ENG made undriven.

In addition, with reverse brake R/B activated, the reverse (backward) revolution output state can be obtained only through the revolution from engine ENG. In this case, the electrical income and outgo between motor/generators MG1, MG2 can be balanced.

Figure 15:
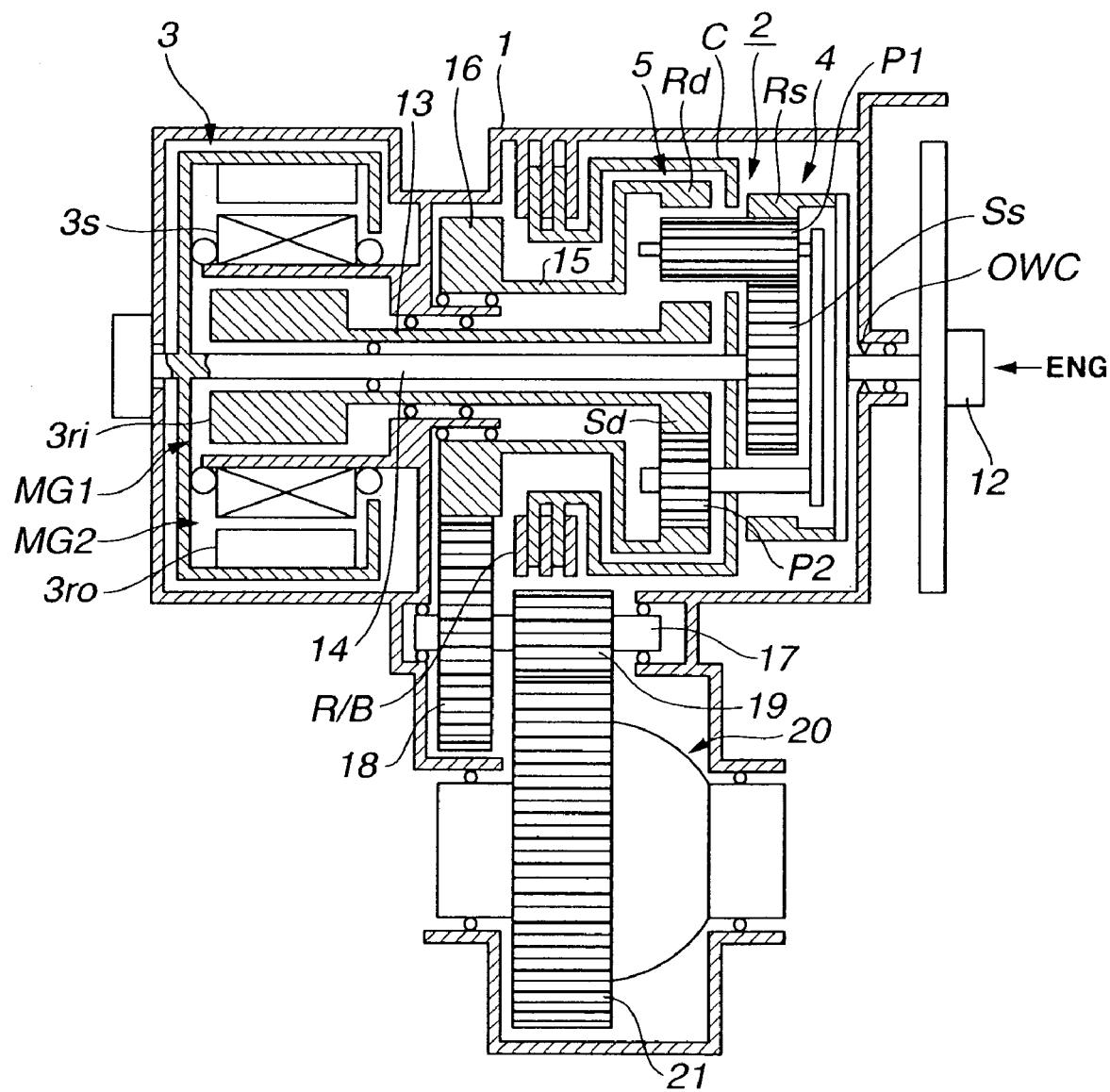
FIG. 15 is a rough longitudinal cross sectional diagram of the hybrid transmission in a fifth preferred embodiment according to the present invention.

It is noted that although, in the hybrid transmission shown in FIG. 14A, a coupling member between carrier C and reverse brake R/B is disposed on an inner periphery of output gear 16, in place of it, the coupling member between carrier C and reverse brake R/B may be disposed on outer peripheries of ring gear Rd and output gear 16, as shown in FIG. 15.

It is also noted that the transmission gear control during the reverse drive of the vehicle as described with reference to FIGS. 16 through 19 is possible in the hybrid transmission shown in FIGS. 13 through 15. This transmission gear control can provide the same action and advantage in the same way as described above on the transmission gear control.

The present invention is not limited to those embodiments described above and it is apparent that various changes and modifications may be made without departing from the sprit and scope of the present invention which is defined in the appended claims.

The entire contents of a Japanese Patent Application No. 2002-049713 (filed in Japan on Feb. 26, 2002) are herein incorporated by reference. The scope of the invention is defined with reference to the following claims.

What is claimed is:

1. A hybrid transmission, comprising:
   a two-degree of freedom differential unit constituted by a single pinion planetary gear set and a double pinion planetary gear set holding a carrier in common to the single planetary gear set and having five rotary members from among which, when revolution states of two rotary members are determined, those of the other rotary members are determined;
   an input end of the hybrid transmission from a prime mover coupled to a ring gear of the double pinion planetary gear set;

an output end of the hybrid transmission to a drive system coupled to a ring gear of the single pinion planetary gear set;
a first motor/generator coupled to a sun gear of the double pinion planetary gear set;
a second motor/generator coupled to a sun gear of the single pinion planetary gear set; and
a brake configured to brake the common carrier.

2. A hybrid transmission as claimed in claim 1, wherein the brake is activated when a large driving force equal to or larger than a predetermined driving force is demanded under a state of a backward revolution output state.

3. A hybrid transmission as claimed in claim 1, wherein the brake is activated during an output revolution stop in a case where the revolution from the prime mover is determined to be under a backward revolution output state.

4. A hybrid transmission as claimed in claim 1, wherein both of the first and second motor/generators are made under non-driven states of zero output torque when the brake is activated.

5. A hybrid transmission as claimed in claim 1, wherein the brake is activated during a stop of the output revolution in a case where only the revolution from at least one of the first and second motor/generators is made under a backward revolution output state.

6. A hybrid transmission as claimed in claim 1, wherein at least one of the first and second motor/generators is disposed within a hybrid transmission housing coaxially to the differential unit.

7. A hybrid transmission as claimed in claim 1, wherein both of the first and second motor/generators are disposed within a hybrid transmission housing with a mutual offset of each of the first and second motor/generators made in a radial direction of the hybrid transmission housing.

8. A hybrid transmission as claimed in claim 1, wherein at least one of the single and double planetary gear sets is disposed at a side adjacent to the first and second motor/generators.

9. An assembling method for a hybrid transmission, the hybrid transmission comprising a two-degree of freedom differential unit constituted by a single pinion planetary gear set and a double pinion planetary gear set holding a carrier in common to the single planetary gear set and having five rotary members from among which, when revolution states of two rotary members are determined, those of the other rotary members are determined and the method comprising:
coupling an input end of the hybrid transmission from a prime mover to a ring gear of the double pinion planetary gear set;
coupling an output end of the hybrid transmission from a drive system to a ring gear of the single pinion planetary gear set;
coupling a first motor/generator to a sun gear of the double pinion planetary gear set;
coupling a second motor/generator to a sun gear of the single pinion planetary gear set; and
installing a brake configured to brake the common carrier.

* * * * *